(12) United States Patent
Yang et al.

(10) Patent No.: US 9,179,147 B2
(45) Date of Patent: Nov. 3, 2015

(54) SOFT DECISION AND ITERATIVE VIDEO CODING FOR MPEG AND H.264

(71) Applicant: RESEARCH IN MOTION LIMITED, Waterloo, CA (US)

(72) Inventors: En-hui Yang, Petersburg, CA (US); Xiang Yu, Kitchener, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 265 days.

(21) Appl. No.: 13/776,858

(22) Filed: Feb. 26, 2013

(65) Prior Publication Data

US 2014/0010288 A1    Jan. 9, 2014

Related U.S. Application Data

(63) Continuation of application No. 13/244,751, filed on Sep. 26, 2011, now Pat. No. 8,411,742, which is a continuation of application No. 12/900,627, filed on Oct. 8, 2010, now Pat. No. 8,331,441, which is a continuation of application No. 11/377,583, filed on Mar. 17, 2006, now Pat. No. 8,005,140.

(51) Int. Cl.
| | |
|---|---|
| *H04N 7/12* | (2006.01) |
| *H04N 11/02* | (2006.01) |
| *H04N 11/04* | (2006.01) |
| *H04N 19/61* | (2014.01) |
| *H04N 19/147* | (2014.01) |
| *H04N 19/103* | (2014.01) |

(52) U.S. Cl.
CPC ....... *H04N 19/00781* (2013.01); *H04N 19/103* (2013.01); *H04N 19/147* (2013.01); *H04N 19/61* (2013.01)

(58) Field of Classification Search
USPC .................................................. 375/240.03
See application file for complete search history.

(56) References Cited

U.S. PATENT DOCUMENTS

| | | | |
|---|---|---|---|
| 5,818,877 | A | 10/1998 | Tsai et al. |
| 8,005,140 | B2 | 8/2011 | Yang et al. |
| 2004/0240591 | A1 | 12/2004 | Sexton et al. |
| 2005/0031034 | A1* | 2/2005 | Kamaci et al. ........... 375/240.03 |
| 2005/0228658 | A1 | 10/2005 | Yang et al. |
| 2006/0013493 | A1 | 1/2006 | Yang et al. |
| 2006/0013497 | A1 | 1/2006 | Yang et al. |
| 2006/0053004 | A1* | 3/2006 | Ceperkovic et al. .......... 704/221 |
| 2006/0222078 | A1 | 10/2006 | Raveendran |
| 2006/0233239 | A1* | 10/2006 | Sethi et al. ............... 375/240.03 |
| 2007/0104272 | A1 | 5/2007 | He et al. |
| 2009/0304090 | A1 | 12/2009 | Cordara et al. |

OTHER PUBLICATIONS

Richardson, I.E.G et al, The MPEG-4 and H.264 Standards, Video Coding for Next-generation Multimedia. 2003, John Wiley & Sons, Ltd. ISBN: 0-470-84837-5.

(Continued)

*Primary Examiner* — Tanmay Shah
(74) *Attorney, Agent, or Firm* — Rowand LLP

(57) ABSTRACT

A method of encoding video data using soft decision quantization makes use of iterative encoding to provide the ability to optimize encoding across different functional elements in a hybrid video encoder. Iterative encoding is used to allow quantization step size, motion prediction and quantization levels to be optimized despite their interrelated nature.

19 Claims, 12 Drawing Sheets

(56) References Cited

OTHER PUBLICATIONS

J. Hanson, "Understanding Video: Applications, Impact and Theory", Sage Publications, 1987.
T. Wiegand, G.J. Sullivan and A. Luthra, "Draft ITU-T Rec. H264/ISO/IEC 14496-10 AVC," JVT of ISO/IEC MPEG and ITU-T VCEG, Doc. JVT-G050r1, 2003.
E.H. Yang, X. Yu, "On Joint Optimization of Motion Compensation, Quantization and Baseline Entropy Coding in H.264 with Complete Decoder Compatibility" Proc. of the 2005 International Conference on Acoustics, Speech, and Signal Processing (ICASSP05), Philadelphia, USA, Mar. 2005, II325-328.
T.Wiegand, H. Schwarz, A. Joch, F. Kossentini, and G.J. Sullivan, Rate-Constrained Coder Control and Comparison of Video Coding Standards, IEEE Transactions on Circuits and Systems for Video Technology, vol. 13, No. 7, pp. 688-703, Jul. 2003.
E.H. Yang, S.Y. Shen, "Distortion program-size complexity with respect to a fidelity criterion and rate distortion function," IEEE Transactions on Information Theory, vol. IT-39, pp. 288-292, 1993.
E.H. Yang, Z. Zhang and T. Berger, "Fixed-slope Universal Lossy Data Compression," IEEE Transactionss on Information Theory, vol. 43, No. 5, pp. 1465-1476, Sep. 1997.
E.H. Yang and Z. Zhang, "Variable-Rate Trellis Source Encoding," IEEE Transactions on Information Theory, vol. 45, pp. 586-608, Mar. 1999.
K. Ramchandran and M. Vetterli, "Rate-distortion Optimal Fast Thresholding with Complete JPEG/MPEG Decoder Compatibility," IEEE Trans. Image Processing, vol. 3, pp. 700-704, Sep. 1994.
M. Crouse and K. Ramchandran, "Joint Thresholding and Quantizer Selection for Decoder-compatible Baseline JPEG," in Proc. IEEE Int. Conf. Acoustics, Speech and Signal Processing, 1995, pp. 2331-2334.
M. Crouse and K. Ramchandran, "Joint Thresholding and Quantizer Selection for Transform Image Coding: Entropy Constrained Analysis and Applications to Baseline JPEG," IEEE Trans. Image Processing, vol. 6, pp. 285-297, Feb. 1997.
E.H. Yang, X. Yu, "Optimal Soft Decision Quantization Design for H.264", Proc. of the 9th Canadian Workshop on Information Theory (CWIT'2005), pp. 223-226, Montreal, Quebec, Jun. 2005.
T.Wiegand and B. Girod, "Lagrangian Multiplier Selection in Hybrid Video Coder Control," in Proceedings of ICIP'2001, pp. 542-545, Oct. 2001.
P.A. Chou, T.Lookabaugh, and R.M. Gray, "Entropy-Constrained Vector Quantization," IEEE Transactions on Acoustics, Speech and Signal Processing, vol. 37, pp. 31-42, Jan. 1989.
W. Effelsberg, and R. Steinmetz, "Video Compression Techniques", Dpunkt, Verlag, 1998.
N. Kamaci and Y. Altunbasak, "Frame Bit Allocation for H.264 using Cauchy-Distribution based Source Modelling," Proc. of the 2005 International Conference on Acoustics, Speech, and Signal Processing (ICASSP05), Philadelphia, USA, Mar. 2005, II57-60.
W. Ding and B. Liu, "Rate Control of MPEG Video Coding and Recording by Rate Quantization Modelling," IEEE Transactions on Circuits and Systems for Video Technology, vol. 6, pp. 12-20, Feb. 1996.
H.M. Hang and J. J. Chen, "Source Model for Transform Video Coder and its Application-Part I: Fundamental Theory," IEEE Transactions on Circuits and Systems for Video Technology, vol. 7 pp. 287-298, Apr. 1997.
H.M. Hang and J. J. Chen, "Source Model for Transform Video Coder and its Application-Part II: Variable Frame Rate Coding," IEEE Transactions on Circuits and Systems for Video Technology, vol. 7, pp. 299-311, Apr. 1997.
B. Girod, "Efficiency Analysis of Multihypothesis Motion-Compensated Prediction for Video Coding," IEEE Transactions on Image Processing, vol. 9, No. 2, pp. 173-183, Feb. 2000.
G.J. Sullivan and T. Wiegand, "Rate-Distortion Optimization for Video Compression," IEEE Signal Processing Magazine, pp. 74-90, Nov. 1998.
A. Ortega and K. Ramchandran, "Rate-Distortion Methods for Image and Video Compression," IEEE Signal Processing Magazine, pp. 23-49, Nov. 1998.
H. Everett, "Generalized Lagrange Multiplier Method for Solving Problems or Optimum Allocation of Resources," Operations Research, vol. 11, No. 3, pp. 399-417, Jun. 1963.
G. Bjntegaard, and K. Lellevold, "Context-adaptive VLC (CVLC) coding of coefficients," JVT-C028, Joint Video Team (JVT) of ISO/IEC MPEG \& ITU-T VCEG, 3rd Meeting, Fairfax, Virginia, USA, May 6-10, 2002.
K. Ramchandran, A. Ortega, M. Vetterli, "Bit allocation for dependent quantization with applications to multiresolution and MPEG video coders," IEEE Transactions on Image Processing, vol. 3, Issue 54, pp. 533-545, Sep. 1994.
J. Wen, M. Luttrell, and J. Villasenor, "Trellis-based R-D Optimal Quantization in H.263+," IEEE Transaction on Image Processing, vol. 9, No. 8, pp. 4131-1434, Aug. 2000.
I.E.G. Richardson, "H.264 and MPEG-4 video compression: video coding for next generation multimedia," Chichester; Hoboken, NJ: Wiley, 2003, vol. 5. No. 2, pp. 116-119, Mar. 1997.
United States Patent and Trademark Office, Office Action for U.S. Appl. No. 11/377,583 dated Jul. 7, 2010.

\* cited by examiner

SOFT DECISION AND ITERATIVE VIDEO CODING FOR MPEG AND H.264

CROSS-REFERENCE TO RELATED APPLICATIONS

This application is a continuation of U.S. patent application Ser. No. 13/244,751 filed Sep. 26, 2011, which is a continuation of U.S. patent application Ser. No. 12/900,627 filed Oct. 8, 2010, and grated as U.S. Pat. No. 8,331,441, which is a continuation of U.S. patent application Ser. No. 11/377,583, filed Mar. 17, 2006, and granted as U.S. Pat. No. 8,005,140, all of which are incorporated herein by reference in their entirety.

FIELD OF THE INVENTION

The present invention relates generally to video encoding. More particularly, the present invention relates to the use of soft decisions and iterative coding in Motion Picture Experts Group (MPEG) and H.264 compliant video encoding.

BACKGROUND OF THE INVENTION

Video compression is employed to allow the creation of digital video files of a manageable size. Although storage capacity and bandwidth have increased since the demand first arose for video compression, so too has the amount of digital video data available. Accordingly, the design of new encoding techniques has progressed to provide both better compression rates and higher perceptual quality. Typically, compression techniques can be classified as either lossy or lossless compression. Lossless compression, also referred to as entropy compression, seeks to remove unneeded redundancy in the data and replace the redundant data with a marker allowing full retrieval of the original data. Although this is ideal for completely accurate reproduction of a data stream or data file, it typically is insufficient for video data, as the data is often not sufficiently structured to allow for a sufficient reduction in data file size. Lossy compression discards data in a manner that prevents full recovery of the original file. If lossy compression is employed properly, the discarded data can be perceptually restored by a viewer. A data file or stream cannot be reduced by lossless compression to a size less than the entropy of the source. Lossy compression can be employed to reduce a file below the entropy level, but results in a distortion that can be measured as a rate distortion.

H.264 is a standard compression methodology employed in as MPEG-4 and has proved its superiority to its predecessor encoders in coding efficiency (e.g., it shows a more than 50% rate reduction in comparison to the popular MPEG-2). However, despite the fact that H.264 provides compression advantages, new encoding techniques to refine H.264 encoding can be employed to further increase the compression rates. It should be noted that radical changes to the methodology of compression cannot easily be implemented, as a standard decoder has been defined that must be able to decode the resulting data stream if compatibility with H.264 is to be maintained.

Based on an assumption of four types of redundancy— temporal, spatial, psychovisual, and statistical redundancy— video compression generally utilizes a hybrid structure, as shown in FIG. 1. A data stream is provided as an input to encoder 100. Upon receipt of the data stream, a motion compensation factor is applied to the data stream by motion compensator 112. After having been motion compensated, a video frame is considered to be a residual as, in the ideal, data corresponding to information in a previous frame has been removed. The residual is provided to a transform processor 102 that applies a transform (typically a discrete cosine transform (DCT)), the output of which is provided to a quantizer 104. The quantizer 104 applies lossy compression to each frame using an algorithm designed to co-operate with the other functional blocks in the system based on defined quantization steps. H.264 quantizers have been implemented as "hard decision" quantizers that make quantization decisions based solely upon the quantization levels defined. The quantized version of the transformed residual is provided to an entropy encoder 106 that removes the statistical redundancy in the data stream, and provides as an output an H.264 encoded bit stream. The output of the quantizer 104 is also used to determine the motion compensation that will be applied to a subsequent frame. The quantizer output is provided to de-quantizer 108, whose output is provided to an inverse transform processor 110. This provides a reconstruction of the quantized residual, and is used by motion compensator 112 to derive a motion prediction that is then combined with a subsequent frame to provide the next residual. In general, motion compensation deals with temporal redundancy (removal of information unchanged from a previous part of the data stream); transform handles spatial redundancy (decoupling correlation of information in an adjoining area); quantization is based on psychovisual redundancy (removing information not needed for the viewer's perception of the image); and entropy coding is designed for removing statistical redundancy (reduction of information through the use of lossless compression). Because the quantization part introduces permanent information loss to video data, video compression is categorized as lossy data compression. Rate distortion theory, as will be understood by those skilled in the art, indicates that the best coding efficiency a lossy compression method can achieve for coding a given information source is characterized by a rate distortion function, or equivalently distortion rate function, of the source. The four coding parts in the hybrid structure all contribute to the rate distortion function and there is no easy way to quantitatively separate their contributions. Therefore, the fundamental trade-off in the design of a video compression system is its overall rate distortion performance. The performance of each component has been subject to numerous optimization attempts, many of which use rate distortion (RD) methods.

RD methods for video compression can be classified into two categories. The first category computes the theoretical rate distortion function based on a given statistical model for video data. In general, there is always a problem of model mismatch due to the non-stationary nature of video data. The second category uses an operational rate distortion function, which is computed based on the data to be compressed. There exist two main problems with operational rate distortion methods. First, the formulated optimization problem is restricted and the rate distortion cost is optimized only over motion compensation and quantization step sizes. Second, there is no simple way to solve the restricted optimization problem if the actual rate distortion cost is used. Because hard decision quantization is used, there is no simple analytic formula to represent the actual rate distortion cost as a function of motion compensation and quantization step sizes. Hence, typical solutions to the restricted optimization problem involve a brute force approach that is computationally expensive. For this reason, an approximate rate distortion cost is often used in the restricted optimization problem in many operational rate distortion methods. For example, the optimization of motion compensation based on the prediction error instead of the actual distortion, which is the quantization error has been used in some implementations.

Most video compression standards, from the early MPEG-1, H.261, to the newest H.264 (which is also referred as MPEG-4, part-10), utilize the well-known hybrid coding structure shown in FIG. 1. The motion compensation design in H.264 has been significantly improved over previous standards. It allows various block sizes from 4×4 to 16×16. While a large block size is desirable for homogeneous regions, a small block size makes it possible to process details effectively. It also uses higher-pixel prediction accuracy.

For the transform processor function, H.264 uses the discrete cosine transform (DCT) with a block size of 4×4 while most other standards for video and image coding usually use the 8×8 DCT transform. Specifically, the transform matrix is $$\hat{w} = \begin{pmatrix} 1/2 & 1/2 & 1/2 & 1/2 \\ 1/\sqrt{2.5} & 0.5/\sqrt{2.5} & -0.5/\sqrt{2.5} & -1/\sqrt{2.5} \\ 1/2 & -1/2 & -1/2 & 1/2 \\ 0.5/\sqrt{2.5} & -1/\sqrt{2.5} & 1/\sqrt{2.5} & -0.5/\sqrt{2.5} \end{pmatrix}$$

To facilitate fast implementation with integer operations, a simplified transform matrix is obtained as $$w = \begin{pmatrix} 1 & 1 & 1 & 1 \\ 1 & 1/2 & -1/2 & -1 \\ 1 & -1 & -1 & 1 \\ 1/2 & -1 & 1 & -1/2 \end{pmatrix}$$

by extracting a factor f from $\hat{w}$ as $$f = \begin{pmatrix} 1/4 & \sqrt{1/10} & 1/4 & \sqrt{1/10} \\ \sqrt{1/10} & 2/5 & \sqrt{1/10} & 2/5 \\ 1/4 & \sqrt{1/10} & 1/4 & \sqrt{1/10} \\ \sqrt{1/10} & 2/5 & \sqrt{1/10} & 2/5 \end{pmatrix}$$

with $\hat{w}Y\hat{w}^T = wYw^T \otimes f$ for any 4×4 matrix Y where the symbol $\otimes$ denotes the element-wise multiplication.

Quantization in H.264 is simply achieved by a scalar quantizer. It is defined by 52 step sizes based on an index parameter p=0, 1, ... 51. The quantization step size for a given p is specified as $$q[p] = h[p_{rem}] \cdot 2^{p_{quo}} \quad (1)$$

where $p_{rem} = p\%6$ and $p_{quo} = \text{floor}(p/6)$ are the remainder and quotient of p divided by 6, and $$h[i] \in \left\{ \frac{10}{16}, \frac{11}{16}, \frac{13}{16}, \frac{14}{16}, \frac{16}{16}, \frac{18}{16} \right\}, 6 > i \geq 0.$$

For the purpose of fast implementation, quantization and transform in H.264 are combined together. Specifically, the factor matrix f is combined with the quantization step size. Suppose that the decoder receives the quantized transform coefficients u and the quantization parameter p for a 4×4 block. Then the following process is defined in H.264 for the decoding, $$T^{-1}(Q^{-1}(u)) = \hat{w}^T(u \cdot q[p]) \cdot \hat{w} \quad (2)$$
$$= \hat{w}^T((u \cdot h[p_{rem}] \cdot 2^{p_{quo}}) \otimes f) \cdot w,$$
$$= w^T(u \otimes (dq[p_{rem}]) \cdot 2^{p_{quo}}) \cdot w \cdot \frac{1}{64},$$

where $dq = (f \cdot h[i] \cdot 64)$ with $6 > i \geq 0$ are constant matrices defined in the standard. It is clear that the computation of (2) can be conducted using only integer operations.

H.264 supports two entropy coding methods for residual coding, i.e., context adaptive variable length coding (CAVLC) in the baseline profile and context adaptive binary arithmetic coding (CABAC) in the main profile. CAVLC is based on variable length coding tables, while CABAC uses advanced arithmetic coding methods. Arithmetic coding is generally considered to be superior to variable length coding because it can adapt to symbol statistics and assign a non-integer number of bits to code a symbol. However, the complexity of arithmetic coding is much higher. Overall, CAVLC provides a baseline solution for applications with limited computation resource while CABAC targets better coding performance.

As discussed above, each individual coding part in the hybrid structure of H.264 has been well designed to achieve good coding performance using the state-of-the-art technologies. Optimization of an individual part in H.264 alone is unlikely to provide remarkable performance improvement. Further improvement of the coding performance largely depends on the design of the whole structure, for which rate distortion methods are studied. A joint optimal design of the whole encoding structure is possible because the standard only specifies a syntax for the coded bit stream, leaving the details of the encoding process open to each designer. This allows for a number of different encoder implementations, with a standard decoder being able to decode a data stream from any H.264 complain encoder.

Rate distortion methods for video compression in general can be roughly classified into two categories: methods based on source modeling and methods based on an operational rate distortion cost. The first category uses the theoretical rate distortion function, which characterizes the optimal rate distortion performance of any lossy coding method. The challenge of this approach is to model the data statistics. In general, a model mismatch typically results in inefficiencies in encoding. Because all theoretical results in rate distortion theory are based on a given statistical model, the model mismatch problem constantly exists as a gap between the simplified theoretical models and the complicated real world data.

The second category of rate distortion methods is based on an operational rate distortion function. An operational rate distortion framework for efficiently distributing bit budget among temporal and spatial coding methods for MPEG video compression has been proposed. Typically these solutions result in exponential complexity, which is tackled by utilizing a monotonicity property of operational rate distortion curves for dependent blocks/frames. The monotonicity property is based on an assumption that rate distortion performance for coding one frame is monotonic in the effectiveness of prediction, which depends on the reproduction quality of reference frames. A pruning rule can then be applied to reduce search complexity based on the monotonicity property. Generally speaking, the above assumption implies a linear relationship between distortion and the coding rate. This assumption is valid to a large extent for early standards such as MPEG-1, MPEG-2. However, the total coding rate includes more than just the rate for coding residuals. Motion vectors from motion compensation also need to be transmitted. For early standards, motion compensation is based on a large block size of 16×16, leading to a small number of motion vectors to be transmitted. As such, motion vector transmission consumes relatively few bits, and can largely be ignored. Thus, it is acceptable to apply the above assumption to simplify the rate distortion problem. However, when small block sizes, such as those in H.264, are allowed for motion compensation, motion vectors consume a significant portion of the total coding bits. Thus, this method cannot be directly applied to H.264.

Using the generalized Lagrangian multiplier method, a simple, effective operational RD method for H.264 video compression, particularly for the optimization of motion compensation has been proposed. Motion compensation is optimized based on the following operational rate distortion cost, $$v = \underset{v}{\operatorname{argmin}} d(x, p(m, v)) + \lambda \cdot r(v) \qquad (3)$$

where x stands for the original image block, p(m,v) is the prediction with given prediction mode m and motion vector v, d(•) is a distance measure, r(v) is the number of bits for coding v, and λ is the Lagrangian multiplier. Empirical evidence indicates that a good Lagrangian multiplier λ, can be represented as $$\lambda = 0.85 \cdot 2^{(p-12)/3} \qquad (4)$$

where p=0, 1, . . . 51 is the quantization parameter in (1). Clearly, the optimization here is not conducted based on the actual rate distortion cost. In order to avoid the expensive computation for residual coding, the distortion is approximated by the prediction error and the residual coding rate is not computed for motion compensation. Therefore, the optimization here is largely separated from residual coding.

It is, therefore, desirable to provide a method of encoding video data using H.264, as well as other encoding standards, making use of joint optimization across different elements in a hybrid encoder.

BRIEF DESCRIPTION OF THE DRAWINGS

Embodiments of the present invention will now be described, by way of example only, with reference to the attached Figures, wherein.

DETAILED DESCRIPTION

Figure 1:
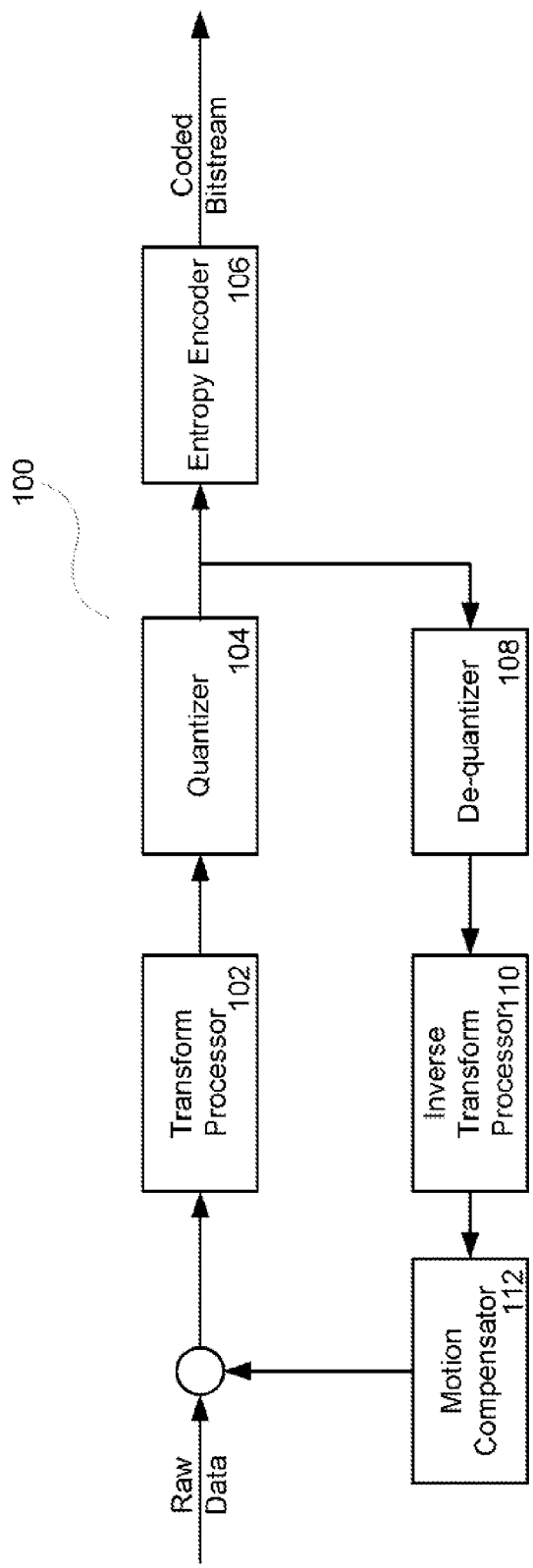
FIG. 1 is a block diagram illustrating a hybrid video encoder.

The actual rate distortion cost is used as an optimization objective function in contrast to many rate distortion methods based on approximate operational rate distortion cost. Parameters that a hybrid video encoder can optimize in addition to motion compensation and quantization step sizes are examined, and on that basis a joint optimization framework for hybrid video coding is formulated that can be applied to H.264 encoding. Using soft decision quantization (SDQ) instead of hard decision quantization, the quantized residual itself acts as a free parameter that can be optimized in order to improve compression performance. In the SDQ, the entropy coding is brought into the quantization design so that symbiotic effects between quantization and entropy coding can be obtained. The general optimization framework can then be formulated as jointly designing motion compensation, quantization, and entropy coding in the hybrid video coding structure. Surprisingly, this generality not only improves compression performance in terms of the rate distortion tradeoff, but also makes the optimization problem algorithmically tractable. Indeed, with respect to the baseline profile of H.264, three rate distortion optimization algorithms—a graph-based algorithm for optimal soft decision quantization given motion compensation and quantization step sizes, an iterative algorithm for optimal residual coding given motion compensation, and an iterative overall algorithm for H.264 baseline profile encoding can be employed—with them embedded in the indicated order in a presently preferred embodiment. SDQ is an important element, and in one embodiment, the algorithm for optimal SDQ can be considered core. It helps to bring motion compensation, quantization and entropy coding all into the optimization problem with the actual rate distortion cost being its objective function, enabling joint design of components in the hybrid coding structure. The SDQ design can be based on a graph structure, which depends on the specific entropy coding method in the hybrid coding structure, for instance, the context adaptive variable length coding (CAVLC) method in the case of H.264 baseline profile encoding. Given motion compensation and quantization step sizes, the graph-based algorithm can perform optimal soft decision quantization to certain degree. The disclosed iterative overall algorithm has been implemented based on the reference encoder JM82 of H.264. Comparative studies show that it achieves a significant performance gain over other baseline-based methods reported in the literature.

In a first aspect of the present invention, there is provided a method of encoding a digitized video frame as an MPEG frame. The method comprises the steps of receiving the digitized video frame; applying a predetermined motion compensation and a transform to the digitized video frame to obtain a transformed residual frame; iteratively determining quantized transform coefficients based on the transformed residual frame for encoding as an MPEG frame by assuming a fixed motion prediction, applying a soft decision quantization, using the fixed motion prediction, for fixed quantization step sizes to the transformed residual frame to obtain quantized transform coefficients, updating the quantization step sizes using the quantized transform coefficients, and repeating the steps of applying the soft decision quantization for the updated step sizes, and updating the step sizes until a rate distortion cost associated with the quantized transform coefficients and quantization step sizes is below a predefined threshold; and entropy encoding the iteratively quantized transform coefficients and quantization step sizes along with motion prediction to obtain an MPEG frame.

In an embodiment of the first aspect of the present invention, the soft decision quantization is designed for encoding co-operation with the method of entropy coding used in the step of entropy encoding the iteratively determined quantized transform coefficients to improve the rate distortion performance of the iteratively determined quantized transform coefficients. In other embodiments, the method includes the step of determining a motion compensation in accordance with the iteratively determined quantized transform coefficients and quantization step sizes. The step of determining a motion compensation can include: computing a motion prediction in accordance with a quantized residual frame determined from the iteratively determined quantized transform coefficients and quantization step sizes; iteratively applying the soft decision quantization using the computed motion prediction, and updating the step sizes until a rate distortion cost associated with the quantized residual encoding is below a predetermined threshold; and repeating the steps of computing the motion prediction in accordance with the quantized residual reconstruction and iteratively applying the soft decision quantization and updating the step size until an actual rate distortion cost associated with the motion prediction and encoded quantized residual is below a predetermined rate distortion cost threshold.

In a second aspect of the present invention, there is provided a method of encoding a digitized video frame as an MPEG frame. The method comprises: receiving the digitized video frame; applying a predetermined motion prediction and a transform to the digitized video frame to obtain a transformed residual; applying a soft decision quantization based on the predefined motion prediction to the transformed residual to obtain a soft quantized residual; computing a motion prediction in accordance with the soft quantized residual; repeating the steps of applying the soft quantization based on the computed motion prediction and computing the motion prediction until an actual rate distortion cost associated with the motion prediction and encoded soft quantized residual is below a predetermined rate distortion cost threshold; and entropy coding the soft quantized residual along with the motion prediction to obtain an MPEG frame.

In embodiments of the second aspect of the present invention, the soft decision quantization is designed for encoding co-operation with the method of entropy coding used in the step of entropy encoding the iteratively determined soft quantized transform coefficients for the purpose of improving the rate distortion performance of the iteratively determined quantized transform coefficients. In another embodiment, the step of applying a soft decision quantization includes: applying soft decision quantization for fixed quantization step sizes to the transformed residual to obtain quantized transform coefficients; updating the quantization step sizes using the quantized transform coefficients; and repeating the steps of applying the soft decision quantization for the updated step sizes and updating the step sizes until a rate distortion cost associated with the quantized transform coefficients and quantization step sizes is below a predefined threshold.

In a third aspect of the present invention, there is provided a method of encoding a digitized video frame as an H.264 compliant frame. The method comprises the steps of: receiving the digitized video frame; applying a predetermined motion compensation and a transform to the digitized video frame to obtain a transformed residual; applying a soft decision quantization to the transformed residual to obtain a quantized transformed residual; and entropy coding the soft decision quantized transformed residual along with the motion compensation to obtain the H.264 complaint frame.

In an embodiment of the present invention, the soft decision quantization is designed for symbiotic co-operation with the method of entropy coding employed in the step of entropy coding the soft decision quantized residual. In another embodiment, the step of applying the soft decision quantization includes computing the quantized transform coefficients, U, as $$U = \underset{U}{\operatorname{argmin}} \sum_{k=1}^{16K} d(z_k, T^{-1}(u_k \cdot q_{\lceil k/16 \rceil})) + \lambda \cdot r(U),$$

where q is a quantization step size, d(•,•) represents the distortion between the residual frame and the quantized residual frame determined from U and quantization step sizes, and r(U) is the number of bits needed for the method of entropy coding to encode U.

In a further embodiment, the step of applying the soft decision quantization includes: applying a soft decision quantization, based on a predetermined motion prediction, to the transformed residual to obtain quantized transform coefficients, the applied soft decision quantization having predetermined quantization step sizes; computing updated quantization step sizes in accordance with the quantized transform coefficients; and iteratively obtaining new quantized transform coefficients using the computed quantization step sizes, and computing the updated quantization step sizes in accordance until a rate distortion cost associated with the quantized transform coefficients and quantization step sizes is less than a predetermined threshold. In further embodiments, the steps of iteratively obtaining new quantized transform coefficients, U, and computing the updated quantization step sizes, q, involve determining the set {q,U} as $$\{q, U\} = \underset{q,U}{\operatorname{argmin}} \sum_{k=1}^{16K} d(z_k, T^{-1}(u_k \cdot q_{\lceil k/16 \rceil})) + \lambda \cdot (r(U) + r(q)),$$

where r(q) is the number of bits needed for the method of entropy coding to encode q. In other embodiments, the step of computing updated quantization step sizes, q, in accordance with the quantized transform coefficients U includes determining q as $$q = \underset{q}{\operatorname{argmin}} \sum_{k=1}^{16K} d(z_k, T^{-1}(u_k \cdot q_{\lceil k/16 \rceil})) + \lambda \cdot r(q).$$

In further embodiments, the step of determining q includes using a Viterbi search to traverse a trellis representing the quantization step sizes of the solution space of q and the corresponding rate distortion cost of each state transition.

In a further embodiment, the method includes the step of determining a motion prediction in accordance with the quantized residual determined from the quantized transformed residual, which in turn is determined from quantized transform coefficients and quantization step sizes. The step of determining the motion prediction, {m,V} can include computing $$\{m, V\} = \underset{m,V}{\operatorname{argmin}} \sum_{k=1}^{16K} d(X - P(m, V), \hat{Z}) + \lambda \cdot (r(V) + r(m))$$

where $\hat{Z}$ represents a reconstruction of the quantized residual, X-P(m, V) is the residual resulting from the prediction P(m, V), and r(m) and r(V) represents the number of bits needed for the method of entropy coding to encode the prediction P(m, V). In other embodiments, the method includes the steps of obtaining a new residual using the determined motion prediction and applying the transform to the new residual to obtain an updated transformed residual; applying the soft decision quantization to the updated transformed residual in accordance with the determined motion prediction to obtain an updated quantized residual; updating the motion prediction in accordance with the updated quantized residual; and repeating the steps of obtaining a new residual, applying the soft decision quantization to the updated transformed residual and updating the motion prediction until a rate distortion cost associated with the motion compensation and updated quantized residual is smaller than a predetermined rate distortion threshold. The step of applying the soft decision quantization can include obtaining updated quantized transform coefficients U as $$U = \underset{U}{\operatorname{argmin}} \sum_{k=1}^{16K} d(z_k, T^{-1}(u_k \cdot q_{\lceil k/16 \rceil})) + \lambda \cdot r(U),$$

where q is a quantization step size, d(•,•) represents the distortion between the residual frame and the updated quantized residual frame determined from U and quantization step sizes, and r(U) is the number of bits needed for the method of entropy coding to encode U. In further embodiments, the step of obtaining updated U is followed by the steps of: determining new quantization step sizes in accordance with U; and iteratively repeating the steps of obtaining U and determining new quantization step sizes until a rate distortion cost associated with the quantized residual is below a predetermined threshold. The step of determining new quantization step sizes can include calculating the step size, q, as $$q = \underset{q}{\operatorname{argmin}} \sum_{k=1}^{16K} d(z_k, T^{-1}(u_k \cdot q_{\lceil k/16 \rceil})) + \lambda \cdot r(q),$$

where U is the newly updated quantized transform coefficients. The step of updating the motion prediction, {m,V} can include computing $$\{m, V\} = \underset{m,V}{\operatorname{argmin}} \sum_{k=1}^{16K} d(X - P(m, V), \hat{Z}) + \lambda \cdot (r(V) + r(m))$$

where $\hat{Z}$ represents the newly updated quantized residual.

In another embodiment, the step of applying a soft decision quantization includes dividing the transformed residual into a plurality of distinct blocks; computing soft decision quantized transform coefficients for each of the plurality of distinct blocks; and combining the quantized transform coefficients of each of the plurality of blocks to obtain quantized transform coefficients for the entire transformed residual. The step of computing the soft decision quantized transform coefficients can include computing a block of quantized transform coefficients, u, for each block in the plurality as $$u = \underset{u}{\operatorname{argmin}} \left\| c - u \otimes dq[p_{rem}] \cdot 2^{P_{quo}}/64) \otimes B \right\|^2 + \lambda \cdot r(u).$$

In other embodiments, the step of computing the block of quantized transform coefficients includes constructing a graph having paths from a start node to an end node, the paths representing all possible blocks of quantized transform coefficients for the given transformed residual, each path having a cost defined as the sum of all costs allocated to all branch transitions from one state to another along the path, the cost being equal to the rate distortion cost of the corresponding block of quantized transform coefficients u calculated as $$\|c - u \otimes dq[p_{rem}] \cdot 2^{P_{quo}}/64) \otimes B\|^2 + \lambda \cdot r(u);$$

traversing the path in the graph leading from the start node to the end node having the minimum associated cost; and determining the quantized transform coefficients associated with the traversed path. In further embodiments, nodes in the graph are connected to neighboring nodes as determined by characteristics of the method of entropy coding applied in the step of entropy coding the soft decision quantized transformed residual. In other embodiment, nodes are connected to neighboring nodes by branches, each branch having a weight determined in accordance with characteristics of the method of entropy coding, such as context adaptive variable length coding, applied in the step of entropy coding the soft decision quantized transformed residual.

In a fourth aspect of the present invention, there is provided a method of encoding a digitized video frame as an H.264 compliant frame. The method comprises receiving the digitized video frame; applying a predetermined motion compensation and a transform to the digitized video frame to obtain a transformed residual; iteratively applying a soft decision quantization, having defined quantization step sizes, to the transformed residual to obtain quantized transform coefficients, and updating the defined quantization step sizes in accordance with the quantized transform coefficients until a rate distortion cost associated with the iteratively quantized transform coefficients and quantization step sizes is below a threshold; iteratively determining a motion prediction based on the iteratively quantized residual determined from the iteratively quantized transform coefficients and quantization step sizes, applying the motion prediction and the transform to the original digitalized video frame to obtain an updated transformed residual and iteratively applying the soft decision quantization to the updated transformed residual and updating defined quantization step sizes in accordance with the determined motion compensation until a rate distortion cost associated with the quantized residual and motion prediction is below a threshold; and entropy coding the soft decision quantized residual along the determined motion compensation to obtain the H.264 complaint frame.

In embodiments of the fourth aspect of the present invention, the soft decision quantization is designed for symbiotic co-operation with the method of entropy coding employed in the step of entropy coding the soft decision quantized residual, and may include computing the quantized transform coefficients, U, as $$U = \underset{U}{\operatorname{argmin}} \sum_{k=1}^{16K} d(z_k, T^{-1}(u_k \cdot q_{\lceil k/16 \rceil})) + \lambda \cdot r(U),$$

where q is a quantization step size. Updating the quantization step sizes may include computing new quantization step sizes q as $$q = \underset{q}{\operatorname{argmin}} \sum_{k=1}^{16K} d(z_k, T^{-1}(u_k \cdot q_{\lceil k/16 \rceil})) + \lambda \cdot r(q).$$

The step of determining the motion prediction, {m,V} can include computing $$\{m, V\} = \underset{m,V}{\operatorname{argmin}} \sum_{k=1}^{16K} d(X - P(m, V), \hat{Z}) + \lambda \cdot (r(V) + r(m))$$

In another aspect, the present application describes a method for obtaining an optimal sequence of quantized coefficients for a block of transform residuals, based on a context-adaptive entropy encoder. The method includes constructing a graph representing a plurality of sequences of quantized coefficients for the block of transform residuals; and selecting in said graph a sequence of quantized coefficients that has a minimum rate-distortion cost, wherein rate-distortion cost is based on distortion cost and rate cost, and wherein rate cost is based on the entropy encoder.

In a further aspect, the present application describes an apparatus for obtaining an optimal sequence of quantized coefficients for a block of transform residuals, the apparatus comprising a quantizer and a context-adaptive entropy encoder. The quantizer is configured to construct a graph representing a plurality of sequences of quantized coefficients for the block of transform residuals; and select in said graph a sequence of quantized coefficients that has a minimum rate-distortion cost, wherein rate-distortion cost is based on distortion cost and rate cost, and wherein rate cost is based on the entropy encoder.

In yet a further aspect, the present application describes a non-transitory computer-readable storage medium embodying computer-executable instructions that, when executed by a quantizer, cause quantizer to construct a graph representing a plurality of sequences of quantized coefficients for a block of transform residuals; and select in said graph a sequence of quantized coefficients that has a minimum rate-distortion cost, wherein rate-distortion cost is based on distortion cost and rate cost, and wherein rate cost is based on a context-adaptive entropy encoder. The selected sequence of quantized coefficients for the block of transform residuals is optimal.

Other aspects and features of the present invention will become apparent to those ordinarily skilled in the art upon review of the following description of specific embodiments of the invention in conjunction with the accompanying figures.

Generally, the present invention provides a method and system for video coding. The use of soft decision processing allows for iterative coding to optimize multivariable solutions across a number of elements in a hybrid video encoder.

Figure 2:
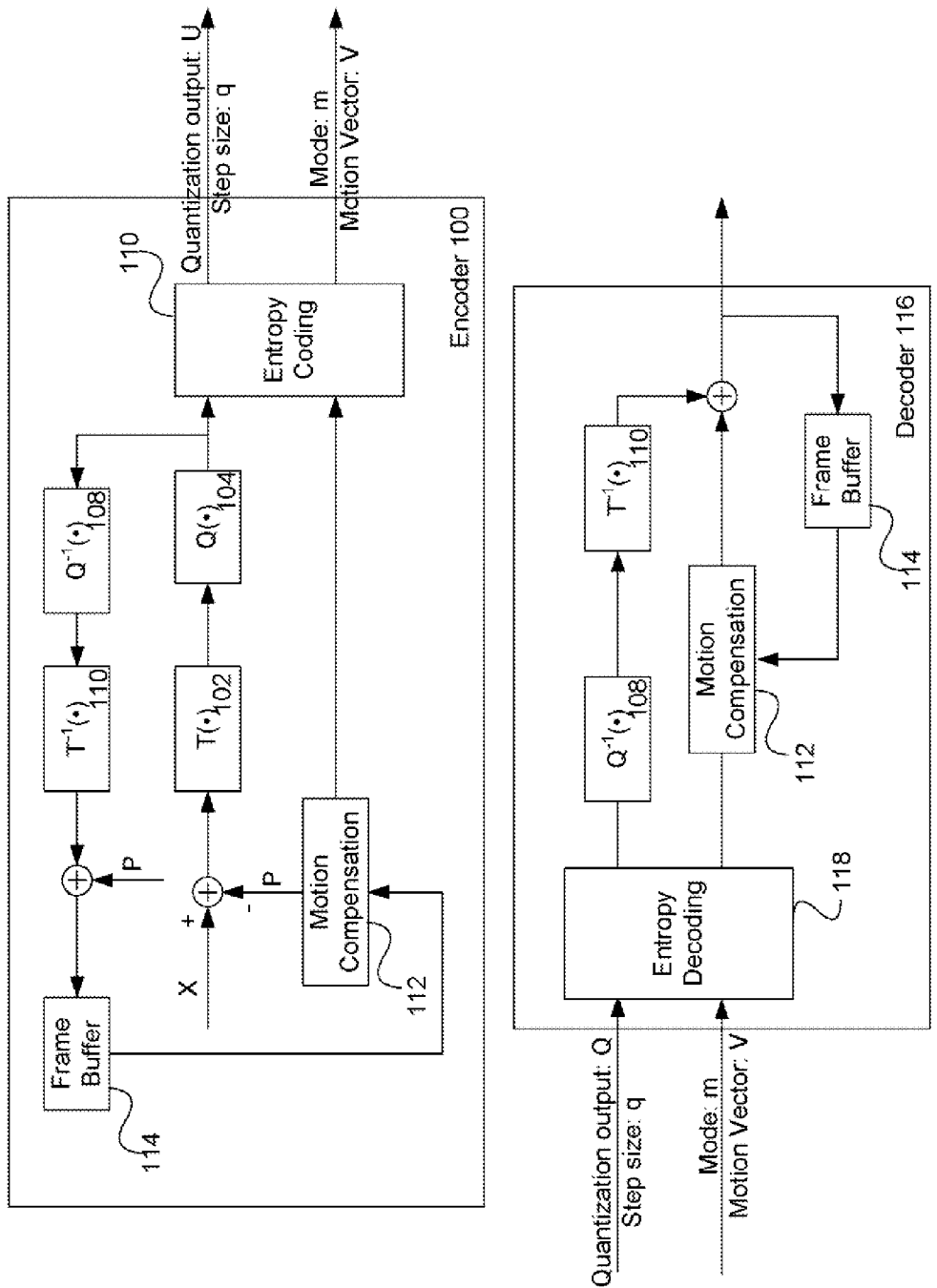
FIG. 2 is a block diagram illustrating a logical layout of a hybrid video encoder and corresponding decoder.

FIG. 2 illustrates the signal flow of a typical hybrid codec. As with FIG. 1, an encoder 100 receives a data stream X. The frames in the data stream are motion compensated by prediction factor P, and the result is provided to transform processor 102. The transformed residual is provided to quantizer 104, whose output is provided to entropy encoder 111. The output of quantizer 104 is also provided to inverse quantizer 108, and then to inverse transform 110. The reconstructed residual, along with the motion compensation factor is provided to frame buffer 114, which is used as a resource by motion compensator 112 in determining the motion prediction value P. The motion compensator 112 also provides prediction information, including a mode and motion vector to entropy encoder 111. The entropy encoder 111 provides as its output an encoded bitstream representative of the quantization output U, the step size q, the mode m, and the motion vector V. The bitstream is then transmitted to the decoder 116. The bitstream is entropy decoded by entropy decoder 118, and the separate data streams are provided to inverse quantizer 108 and motion compensator 112. Motion compensator 112 is a mirror of the compensator in the encoder to allow for proper reconstruction of the data stream. It also relies upon output from frame buffer 114. The output of inverse quantizer 108 is provided to inverse transform processor 110, whose output is combined with the output of motion compensator 112 to create the reconstruction of data stream X. The reconstructed frame is provided to Frame buffer 114 as well as to an output. Note that the previously coded frames are assumed known in the frame buffer when optimization of the current frame is discussed. For a given distortion measure d(•), the actual reproduction error for coding a whole frame X is d (X,X̂), where X̂ is the reconstruction of X. Correspondingly, the entire rate for coding X involves in 4 parts, i.e., the prediction modes m, motion vectors V, quantization step sizes q, and quantized transform coefficients U. For a given entropy coding method with its rate function r(•), which is defined as the number of bits for coding an input, the entire coding rate is r(m)+r(V)+r(q)+r(U). The actual rate distortion cost for coding X is $$J = d(X,\hat{X}) + \lambda \cdot (r(m) + r(V) + r(q) + r(U)) \qquad (5)$$

where λ is a positive constant determined by end users based on both the available bandwidth and the expected video quality.

Consider a block-based coding scheme. A frame from the video stream is divided into K 16×16 macroblocks. Each macroblock defines a quantization step size and a prediction mode, i.e., m={$m_1, \ldots, m_K$}, q={$q_1, \ldots, q_K$}. A macroblock can be further partitioned into several sub-blocks according to the prediction mode. The number of subblocks in the whole frame is denoted as L. The motion vectors are then defined as V={$v_1, \ldots, v_K$}. In H.264, the residual coding is based on 4×4 blocks. There are 16K 4×4 blocks in a frame. Let $x_k$ be the kth pixel block, $\hat{x}_k$ be the corresponding reconstruction, and $u_k$ be the corresponding quantized transform coefficient block. Thus, X={$x_1, \ldots, x_{16K}$}, X̂={$\hat{x}_1, \ldots, \hat{x}_{16K}$}, and U={$u_1, \ldots, u_{16K}$}. The actual RD cost of (5) becomes, $$J = \sum_{k=1}^{16K} d(x_k, \hat{x}_k) + \lambda \cdot (r(m) + r(V) + r(q) + r(U)) \qquad (6)$$

From the rate distortion theoretic point of view, a good video compression design would be to find a set of encoding and decoding algorithms to minimize the actual RD cost as given in (6). However, in the syntax-constrained optimization scenario, the decoding algorithms have already been selected and fixed. Thus, complete freedom to find an ideal compression is not available. Specifically, for a given 4×4 quantized transform coefficient block u∈U (subscript omitted for simplicity), the corresponding prediction mode m, motion vector v, and quantization step size q, the reconstruction is computed by $$x = p(m,v) + T^{-1}(u \cdot q) \quad (7)$$

where $T^{-1}(\bullet)$ is the inverse DCT transform. Under this constraint, the maximal variability and flexibility an encoder can enjoy before establishing our optimization problem based on the actual RD cost of (6) should be determined.

Conventionally, the constraint of (7) is used to derive a deterministic quantization procedure, i.e., $$u' = T(x - p(m,v))/q \quad (8)$$

which actually minimizes the quantization distortion $d(x,\hat{x})$. From the syntax-constrained optimization point of view, however, there is no deterministic relationship between u and (m,v) given x. Indeed, inspired by the fixed-slope universal lossy data compression scheme considered in E.-h. Yang, Z. Zhang, and T. Berger, "Fixed-slope Universal Lossy Data Compression", IEEE Transactions on Information Theory, Vol. 43, No. 5, pp. 1465-1476, it can be shown that given (x,m,v), each u (per block) itself (or equivalently U per frame) is a free parameter and an encoder designer has the flexibility to choose the desired u to minimize (6). As will be understood by those skilled in the art, such a determination of u (or equivalently U) is called soft decision quantization.

A simple example illustrating the idea underlying the soft decision quantization is now presented for exemplary purposes. Consider a quantization step size q=5, a block of transform coefficients c=T(x-p(m,v))=(84,0,-8,17,0,-11,-8,1), and the CAVLC method in H.264. The quantization output given by the conventional hard decision quantizer is, $$u' = (17, 0, -2, 3, 0, -2, -2, 0)$$

in this case, the resulting distortion for the block is 15, and the number of bits resulting from using CAVLC to code u' is 45. On the other hand, with λ=30, an SDQ as described may output, $$u = (17, 0, -2, 4, 0, -2, -1, 0)$$

in this case, the resulting distortion is 25, but the number of bits needed for CAVLC to code u reduces to 27. With λ=30, the rate distortion costs resulting from u' and u are respectively 1365 and 835 with the latter significantly smaller than the former. Note that the value −8 is quantized into both −2 and −1 in u, as $c_3 = -8$, $u_3 = -2$ and $c_7 = -8$, $u_7 = -1$; this is where the name "soft decision quantization" comes from. Clearly, SDQ can trade off a little more distortion for a significant rate reduction for using CAVLC.

The idea of trading off a distortion for a better RD performance has already been used partially in the H.264 reference software, however it is only done in an ad hoc fashion. A whole block of quantized coefficients can be discarded under certain conditions, e.g., when there is only one non-zero coefficient taking a value of 1 or −1. This is equivalent to quantizing that coefficient to 0, although a hard decision scalar quantizer outputs 1 or −1. Such practice is well justified by experimental results. To get better compression performance, SDQ can be applied in a systematic and proper fashion.

Figure 3:
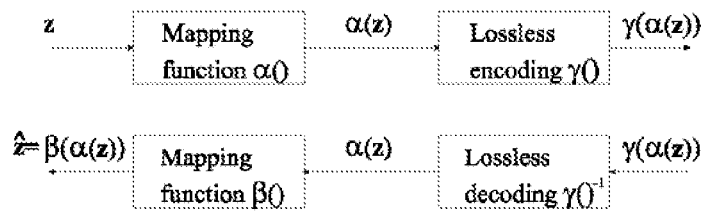
FIG. 3 is a block diagram illustrating the residual encoding and decoding process.

One purpose of SDQ is to minimize the actual RD cost by adapting quantization outputs to a specific entropy coding method. It originates from the fixed-slope universal lossy data compression scheme. Recently SDQ has been successfully applied to improve the JPEG image codec. FIG. 3 shows the universal structure of the fixed-slope lossy compression method. As illustrated in FIG. 3, an encoder (top) uses a mapping function α and lossless encoding γ to create a representation of an input residual block z. In the decoder (bottom), the lossless decoder applies $\gamma^{-1}$ to recreate α(z), which is then decoded by function β( ) to provide $\hat{z} = \beta(\alpha(z))$.

Given a residual block z=x−p(m,v) and a fixed quantization step size q, the RD optimal residual coding is represented as a solution to the minimization problem of $$\min_{\alpha,\beta,\gamma} d(z, \beta(\alpha(z))) + \lambda \cdot l_\gamma(\alpha(z)) \quad (9)$$

where $d(z,\beta(\alpha(z)))$ is the actual distortion of quantization error, $l_\gamma(\alpha(z))$ is the total rate for residual coding, and λ is a constant, which has an interpretation of the slope of the resulting rate distortion curve. In case of syntax constrained optimization, the decoding mapping $\beta(\bullet)$ and the lossless coding algorithm $\gamma/\gamma^{-1}$ are fixed by the standard. Thus, for H.264 encoding $\gamma/\gamma^{-1}$ is the rate function of CAVLC and $\beta(\bullet) = T^{-1}(Q^{-1}(\bullet))$, where $T^{-1}(\bullet)$ and $Q^{-1}(\bullet)$ are the inverse DCT and de-quantization, respectively. In this case, the problem of (9) reduces to finding u=α(z) to minimize the RD cost, i.e., $$u = \arg\min_u d(z, T^{-1}(u \cdot q)) + \lambda \cdot l_\gamma(u) \quad (10)$$

where q is a given quantization step size, and the minimization in (10) is over all possible quantized values. Such a u is not achieved, in general, by the hard decision process using (8).

Having described SDQ, the complete syntax-constrained optimization problem for H.264 hybrid video coding can now be formulated as follows:

$$\min_{mVqU} \sum_{k=1}^{16K} d(z_k, T^{-1}(u_k \cdot q_{\lceil k/16 \rceil})) + \lambda \cdot (r(m) + r(V) + r(q) + r(U)) \quad (11)$$

where $q_{\lceil k/16 \rceil}$ is the quantization step size corresponding to the kth block, the residual is denoted as $Z = \{z_1, \ldots, z_{16K}\} = X - P(m,V)$, and P(m,V) is the prediction given by (m,V). When m and V are fixed, the minimization over U and q in (11) represents the optimal residual coding. In general, the overall solution to (11) represents the best compression performance an encoder under H.264 decoding syntax constraints can possibly achieve for the current frame given previously encoded frames. The optimization problem posed in (11), together with its solution, gives a general framework for jointly designing motion compensation, quantization, and entropy coding to minimize the actual rate distortion cost in H.264.

From the RD optimization point of view, the optimal coding design is now equivalent to solving the problem of (11). This is difficult in general due to the mutual dependency among m, V, q and U. To make the problem tractable, an iterative solution is presented. Motion compensation and residual coding can be optimized alternately in a repeating fashion. Specifically, three rate distortion optimization methods are presented—one for optimal soft decision quantization given motion compensation and quantization step sizes, one for optimal residual coding given motion compensation, and one for overall optimal hybrid video encoding. Application of these methods in series, or in isolation, allows for joint component design to improve hybrid video encoding performance.

Given motion prediction (m,V) and quantization step sizes q, in optimal $$SDQ, U = \arg\min_{U} \sum_{k=1}^{16K} d(z_k, T^{-1}(u_k \cdot q_{\lceil k/16 \rceil})) + \lambda \cdot r(U) \qquad (12)$$

Given motion prediction (m,V), in optimal residual coding, we need to compute $$\{q, U\} = \arg\min_{qU} \sum_{k=1}^{16K} d(z_k, T^{-1}(u_k \cdot q_{\lceil k/16 \rceil})) + \lambda \cdot (r(U) + r(q)) \qquad (13)$$

Figure 4:
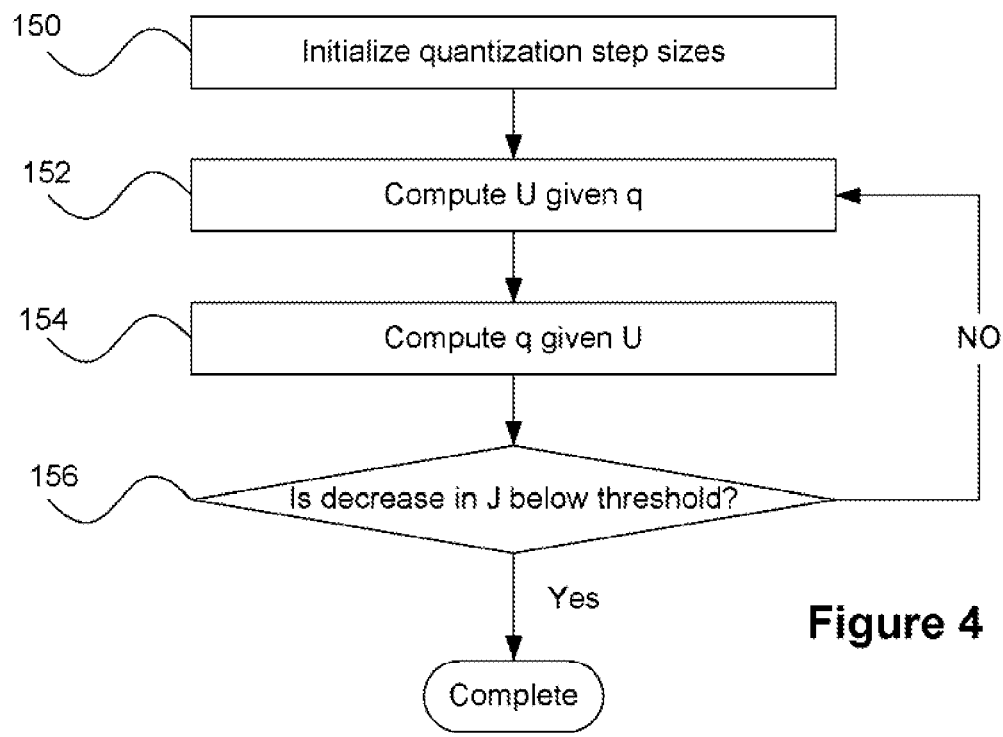
FIG. 4 is a flowchart illustrating a method of iteratively optimizing quantization step size and co-efficients.

To make the (13) tractable, the following iterative procedure with the above SDQ algorithm embedded can be used. As illustrated in FIG. 4 an iterative process of the present invention can be expressed as Step 150. Initialize the quantization step sizes for all macroblocks using the empirical equation of (4) with a given λ and (1).

Step 152. For given q, compute U using an SDQ such as (12).

Step 154. For given U, update q using an update technique such as $$q = \arg\min_{q} \sum_{k=1}^{16K} d(z_k, T^{-1}(u_k \cdot q_{\lceil k/16 \rceil})) + \lambda \cdot r(q) \qquad (14)$$

Step 156. Iteratively repeat Step 152 and 154 until the decrease of J associated with the quantized residual in two iterations is smaller than a given threshold.

The initialization of q targets a fast convergence of the iteration. It has been shown that (4) indicates a close relationship between the quantization step size and the optimal Lagrangian multiplier λ. From the optimization point of view, this relationship also exists for the disclosed fixed-slope method. Thus the above process can be used to initialize the quantization step size to accelerate the convergence of the above iterative algorithm.

Figure 5:
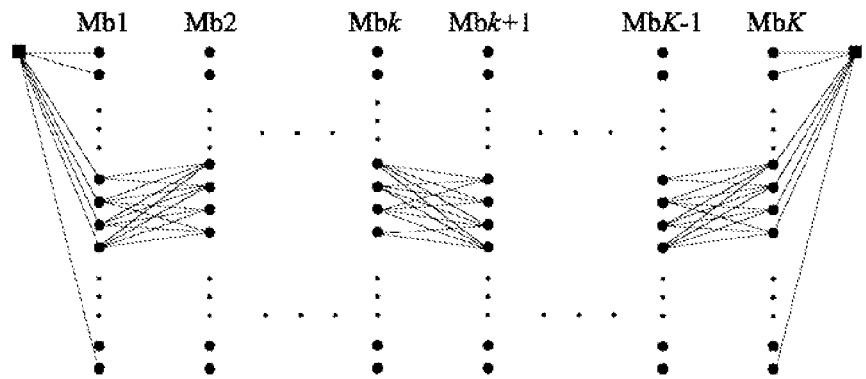
FIG. 5 is a trellis diagram for use in solving iterative elements of the method illustrated in FIG. 4.

The solution to (14) can be obtained by using a trellis structure instead of attempting to solve the function. In H.264, a quantization step size is defined for each 16×16 macroblock, and is coded by a first order predictive code. The distortion term in (14) is macroblock-wise additive with given U. A trellis structure, as shown in FIG. 5, can then be used to evaluate the rate term r(q) additively according to the predictive code. The trellis, in the illustrated embodiment, has 52 states, corresponding to the 52 distinct quantization step sizes, and K stages numbered from j=1 to j=K, each corresponding to a macroblock, in addition to the initial and end stages. States at adjacent stages are fully connected. Assign to each transition from a state, say q, at Stage j, 0≤j<K, to a state, say q', at Stage (j+1) a cost being the sum of the distortion of the (j+1)th macroblock resulting from using q' as its quantization step size and λ times the number of bits needed to encode q' given q. No cost is assigned to transitions from states at Stage K to the end stage. At this point, a Viterbi algorithm can be employed to search the trellis for the desired solution.

In practice, there is no need to explore all 52 states because the distortion is a quadratic function of the step size and the 52 step sizes in H.264 are apart away from each other. Given u and z, the optimal q is likely to be within a small neighboring region of $|T(z) \cdot u/(u \cdot u)|$. Accordingly, it may be sufficient to examine as few as 4 states that fall in this region. Thus, the computational complexity is greatly reduced.

Figure 6:
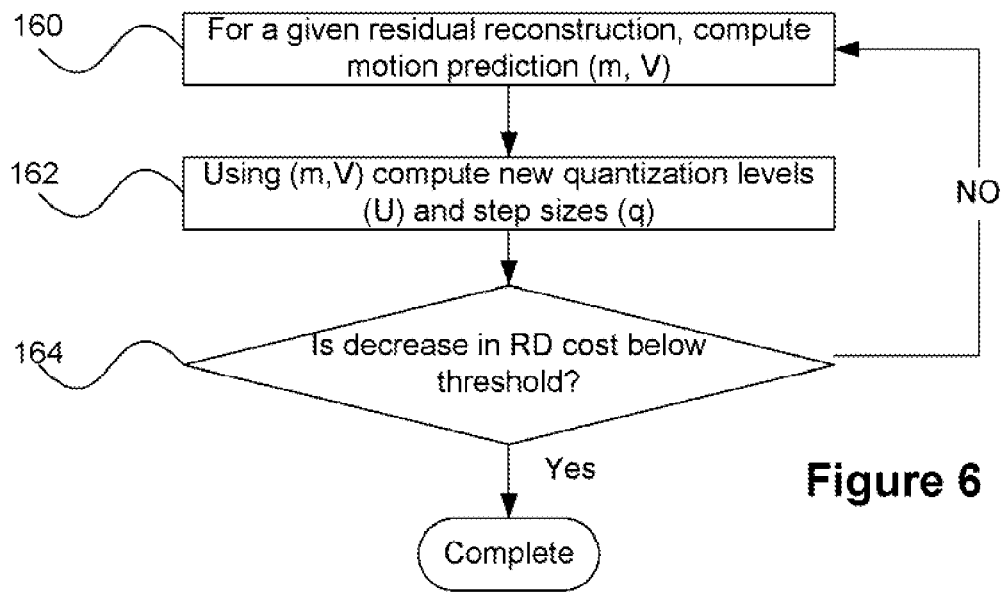
FIG. 6 is a flowchart illustrating an iterative method of optimizing motion compensation.

Based on the algorithm for residual coding disclosed above, a joint optimization algorithm for solving (11) can be employed to alternately optimize motion compensation and residual coding as illustrated in FIG. 6.

Step 160. Motion compensation. For a given residual reconstruction $\hat{Z}:\{\hat{z}_k = T^{-1}(u_k \cdot q_{\lceil k/16 \rceil})\}$, motion prediction is calculated as $$\{m, V\} = \arg\min_{m,V} \sum_{k=1}^{16K} d(X - P(m, V), \hat{Z}) + \lambda \cdot (r(V) + r(m)) \qquad (15)$$

which is equivalent to (11) for a given (q, U).

Step 162. Optimal residual coding. For given m and V, the iterative process described above with relation to equation (13) can be used to find the optimal quantization step sizes q and quantization outputs U.

Step 164. Repeat the above process steps until the decrease of the actual RD cost is smaller than a given threshold.

With reference to the solution to (15), H.264 defines 7 prediction modes for motion compensation. The dependency among these modes is very weak, but the choice of the mode dominates the coding performance because the prediction mode directly determines the partitioning of the whole frame into blocks with various sizes, as well as the number of motion vectors. Therefore, there is no better algorithm than a full search to select the prediction mode. Because the number of different modes is relatively small, this is practical. Motion compensation optimization then becomes a procedure to compute motion vectors for all possible modes and choose the one resulting the lowest RD cost. Meanwhile, because the mode selection dominates the coding performance and determines the number of motion vectors, the dependency of the predictive coding for the motion vectors can be further decoupled. In doing so, the optimization of the whole frame can be solved in a block-by-block manner with the block size determined by a given mode. Specifically, for a given mode m, a corresponding pixel block x and its residual reconstruction block $\hat{z}$ (subscripts omitted for simplicity), the motion vector is computed by $$v = \arg\min_{v} d(x - p(m, v), \hat{z}) + \lambda \cdot r(v) \qquad (16)$$

Since $d(x-p(m,v),\hat{z})=d(x-\hat{z},p(m,v))$, we further have $$v = \arg\min_{v} d(x - \hat{z}, p(m, v)) + \lambda \cdot r(v) \qquad (17)$$

Compare the problem of (17) with the optimization problem of (3). For the given $\hat{z}$, the problem of (17) is equivalent to searching for a prediction to match $x-\hat{z}$ in (3). Therefore, the computational complexity is almost the same. The time for computing $x-\hat{z}$ is negligible when U and q are given. Equation (17) allows a reduction in the actual RD cost, whereas prior art methods have been based on only an approximation of the actual RD cost.

At this point, it is not clear whether or not the above iterative joint optimization algorithm will converge to the global optimal solution of (11). However, the iterative joint optimization algorithm does converge in the sense that the actual rate distortion cost is decreasing at each iteration step. The computational complexity of the proposed iterative algorithm comes from three parts, i.e., optimal residual coding, motion vector computation, and mode selection. In case of H.264, the motion vector updating part and the mode selection part do not greatly increase computational complexity compared to prior art rate distortion optimization methods. The main extra computational complexity of embodiments of the present invention result from the optimal residual coding part, particularly the SDQ algorithm.

To properly employ SDQ, an understanding of how SDQ aids optimization is required. One skilled in the art will appreciate that if designed properly, an SDQ methodology will create symbiotic effects with the required entropy encoder to result in a reduction in the size of the encoded bitstream. The core of a graph-based SDQ method for solving the minimization problem of (12) will now be discussed with reference to the baseline entropy coding method of H.264. It should be understood that although the eventual SDQ algorithm disclosed is designed for H.264 baseline encoding, the techniques used to derive it can be applied to other encoding methods to achieve a similar effect.

For a given residual and quantization step size, q, the distortion term in (12) is block-wise additive. Note that $U=\{u_1, \ldots, u_{16K}\}$. In the baseline profile encoding of H.264, encoding of each block $u_k$ depends not only on $u_k$ itself, but also on its two neighboring blocks. However, such dependency is very weak, and the number of bits needed to encode $u_k$ largely depends on $u_k$ itself. Therefore, in the optimization problem given in (12) for the whole frame, we will decouple such weak dependency. In doing so, the optimization of the whole frame can be solved in a block-by-block manner with each block being 4×4. That is, the optimal U can be determined independently for each $u_k$. By omitting the subscript, the optimization problem given in (12) now reduces to, $$u = \arg\min_u d(z, T^{-1}(u \cdot q)) + \lambda \cdot r(u) \quad (18)$$

where r(u) is the number of bits needed for CAVLC to encode u given that its two neighboring blocks have been optimized.

To solve (18) a graph-based method, as described below, can be employed. The distortion term in (18) is defined in the pixel domain. It contains inverse DCT transform, which is not only time consuming, but also makes the optimization problem intractable. Consider that DCT is a unitary transform, which maintains the Euclidean distance. We choose the Euclidean distortion measure for d(.). Then, the distortion can be computed in the transform domain in an element-wise additive manner.

As reviewed above, the transform and quantization in H.264 are combined together. Specifically, the residual reconstruction process is $$= \hat{w}^T ((u \cdot h[p_{rem}] \cdot 2^{P_{quo}}) \otimes f) \cdot w, \quad (19)$$

-continued $$T^{-1}(u \cdot q) = w^T (u \otimes (dq[p_{rem}]) \cdot 2^{P_{quo}}) \cdot w \cdot \frac{1}{64}$$

Since $\hat{w}$ defines a unitary transform, we have $$\|\hat{w}^T \cdot Y \cdot \hat{w}\|^2 = \|Y\|^2$$

equivalently, that is, $$\|w^T \cdot Y \cdot w\|^2 = \|Y \otimes B\|^2 \quad (20)$$

where Y is any 4×4 matrix, and $$B = \begin{pmatrix} 4 & \sqrt{10} & 4 & \sqrt{10} \\ \sqrt{10} & 5/2 & \sqrt{10} & 5/2 \\ 4 & \sqrt{10} & 4 & \sqrt{10} \\ \sqrt{10} & 5/2 & \sqrt{10} & 5/2 \end{pmatrix}$$

Consider $z = \hat{w}^T \cdot (\hat{w} \cdot z \cdot \hat{w}^T) \cdot \hat{w}$. Applying (21), we compute the distortion term in (18) with the Euclidean measure by $$D = \left\| z - w^T (u \otimes (dq[p_{rem}]) \cdot 2^{P_{quo}}) \cdot w \cdot \frac{1}{64} \right\|^2 \quad (21)$$

$$= \|w^T \cdot ((\hat{w} \cdot z \cdot \hat{w}^T) \otimes f - u \otimes dq[p_{rem}] \cdot 2^{P_{quo}}/64) \cdot w\|^2$$

$$= \|c - u \otimes dq[p_{rem}] \cdot 2^{P_{quo}}/64 \otimes B\|^2$$

where $c = w \cdot z \cdot w^T \otimes f$. The equation of (21) brings to us two advantages. The first is the high efficiency for computing distortion. Note that B and dq are constant matrices defined in the standard. c is computed before soft decision quantization for a given z. Thus, the evaluation of D consumes only two integer multiplications together with some shifts and additions per coefficient. More importantly, the second advantage is the resulted element-wise additive computation of distortion, which enables the soft decision quantization problem to be solved using Viterbi algorithm.

After applying the result of (21) to (18), the soft decision quantization problem becomes $$u = \arg\min_u \|c - u \otimes dq[p_{rem}] \cdot 2^{P_{quo}}/64 \otimes B\|^2 + \lambda \cdot r(u) \quad (22)$$

Note that every each matrix, e.g., u, is a 4×4 matrix. For entropy coding, the 4×4 matrix of u will be zig-zag ordered into a 1×16 sequence. To facilitate our following discussion of algorithm design based on CAVLC, we introduce a new denotation, i.e., to add a bar on the top of a matrix to indicate the zig-zag ordered sequence of the corresponding matrix. Thus, $\bar{u}$ represents the 1×16 vector obtained by ordering u. Then, the equation of (22) is rewritten as follows, $$\bar{u} = \arg\min_{\bar{u}} \|\bar{c} - \bar{u} \otimes \overline{dq}[p_{rem}] \cdot 2^{P_{quo}}/64 \otimes \bar{B}\|^2 + \lambda \cdot r(\bar{u}) \quad (23)$$

where symbol $\otimes$ still indicates the element-wise multiplication between two vectors.

To solve the problem of (23), we need to examine the rate for coding $\bar{u}$ using CAVLC, i.e., $r(\bar{u})$. In the following, we first review the CAVLC method. Then, a graph-based solution is proposed.

CAVLC is used to code zig-zag ordered quantized transform coefficients in the H.264 baseline profile. For a given zig-zag sequence level, CAVLC encoding is conducted in reverse order. In particular, the CAVLC encoding algorithm is summarized as follows, 1. Initialization. The sequence is scanned in reverse order to initialize two sets of parameters. The first set includes TotalCoeffs, T1s and TotalZeros, which represent the total number of non-zero coefficients, the number of trailing coefficients with value ±1, and the number of zero coefficients between the first non-zero coefficient and the scan end, respectively. The definition of T1s is based on an observation that the highest frequency non-zero coefficients in the scan are often a sequence of ±1, called trailing ones. CAVLC allows at most 3 trailing ones to be specially handled, i.e., T1s≤3. The second set is a series of (run, level) pairs, where level means a nonzero coefficient and run is the number of zeros between the current level and the next level.
2. Encoding CoeffToken . . . TotalCoeffs and T1s are combined into one parameter, i.e., CoeffToken, to be encoded. There are 4 choices of look-up tables for encoding CoeffToken. The selection depends on the numbers of non-zero coefficients in upper and left-hand previously coded blocks, i.e., $N_u$ and $N_l$. A parameter $M=(N_u+N_l)/2$ is used to select a table, as shown in the following pseudocode:

```
if(0<=M<2) use table Num-V0 ;
if(2<=M<4) use table Num-V1 ;
if(4<=M<8) use table Num-V2 ;
if(M>=8) 6-bit fixed length code ;
```

3. Encoding the sign of each trailing one. One bit is used to signal the sign, i.e., 0 for + and 1 for −. Note that the number of trailing ones has already been transmitted.
4. Encoding levels. 7 VLC tables, named as Vlc(i) with 0≤i≤6, are used to encode all levels one by one. The table selection criteria are summarized in the following pseudo codes.

```
// Choose a table for the first level
if(TotalCoeffs>10 && T1s<3) i = 1 ; // use Vlc(1)
else i = 0 ; // use Vlc(0)
// Update the table selection after coding each level
vlc[7]={0,3,6,12,24,48,65536}
if(level>vlc_inc[i]) i++;
if(level>3 && FirstLevel) i=2;
```

5. Encoding TotalZeros. One out of 15 tables is chosen based on TotalCoeffs to encode TotalZeros.
6. Encoding runs. For each run, a parameter called ZerosLeft is defined as the number of zeros between the current level and the scan end. It is then used to select one table out of 7 to encode the current runs. E.g., ZerosLeft equals to TotalZeros for the first run.

In summary, CAVLC is designed to take advantage of some observations on quantized coefficients. First, they are commonly sparse, i.e., containing mostly zeros. Run-length coding is used to represent consecutive zeros efficiently. Second, it is very likely that the trailing nonzero coefficients after the zig-zag scan take values of ±1. The trailing one rule is specially developed to handle these levels. Third, the magnitude of non-zero coefficients tends to be higher at the start of the zig-zag scan and lower towards the higher frequencies. The level coding tables Vlc(0-6) are constructed according to this tendency. All these delicate designs together pave the way for CAVLC to be adopted in the baseline profile of H.264.

The minimization problem in (23) is equivalent to a search for an output sequence to minimize the rate distortion cost. Targeting an efficient search, we propose a graph-based method. Specifically, a graph is constructed to represent the vector space of the quantization outputs, with each transition standing for a run, level pair and each path in the graph giving a unique sequence of quantization output. As discussed in the above, the distortion term in (23) can be easily computed in an element-wise additive manner. However, it is difficult to evaluate the rate term due to the adaptive coding table selection in CAVLC. In the following, we shall develop details of the graph to facilitate an additive rate evaluation according to the CAVLC coding process reviewed in the above.

Figure 7:
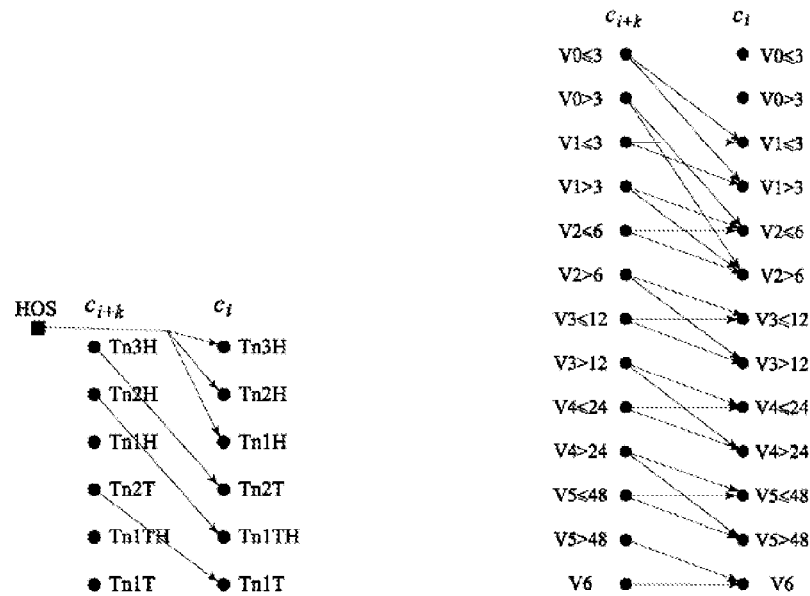
FIG. 7 is a trellis diagram for use in solving iterative elements of the method illustrated in FIG. 6.

FIG. 7 shows a set of states defined based on the trailing one coding rule, which we examine first. The trailing ones are a set of levels, but they are special at three points. First, they must be handled at the beginning of the coding process. (Coding is conducted in reverse order of the zig-zag sequence.) Second, they are consecutive. Third, there is a restriction to consider at most 3 of them. To meet these three requirements, we design three types of states, Tni, i=1, 2, 3. In addition, CAVLC requires to know the number of trailing ones, i.e., T1s, both at the beginning of the coding process (T1s is transmitted.) and at the point that the level coding table is initialized. Eventually, 6 states are defined as shown in the left panel of FIG. 7. Accordingly, transitions are built up with two considerations, i.e., 1. T1s is equal to i for a path starting with TniH;
2. T1s is equal to 3, 2, or 1 for a path which containing Tn1T, Tn1TH, or Tn1H, respectively; where the first one defines T1s at the beginning of a path, and the second one reveals T1s when it is needed to initialize the level coding table.

More states are defined based on features for coding levels in CAVLC, as shown in the right panel of FIG. 7. The two important factors for coding levels are rate functions for corresponding tables and table selection criteria. For the purpose of rate evaluation, two tables are different only if they have different rate functions. The following equations summarize the rate functions for Vlc(0)-Vlc(6), $$r(Vlc(0), u) = \begin{cases} 2u-1 & 0 < u < 8 \\ -2u & -8 < u < 0 \\ 19 & 8 \le |u| \le 15 \\ 28 & o.w. \end{cases} \quad (24)$$

$$r(Vlc(i), u) = \begin{cases} \frac{|u|-1}{2^{i-1}} + i + 1 & |u| < 15 \cdot 2^{i-1} \\ 28 & o.w. \end{cases} \quad i = 1, \ldots, 6 \quad (25)$$

Clearly, different states should be defined in the graph for codes with different rate functions. Now consider table selection. It is based on a set of thresholds assigned to those codes, i.e. $T_i = 3 \cdot 2^{i-1}$, i=1, ..., 5. Note that the threshold for Vlc(0) is 0, meaning that it always switches to another table. There is no threshold defined for Vlc(6). Once it is selected, it will be used until the end of the current block. Other than these, the coding table will be switched from Vlc(i) to Vlc(i+1) when the current level is greater than Vlc(i) for i=1, ..., 5. Vlc(0) will switch to Vlc(2) when level>3. Therefore, each coding table except Vlc(6) needs to have two states in order to clearly determine the next coding table according to the given level. As shown in the right panel of FIG. 7, there are 13 states defined, named as either $V_i \leq T_i$ or $V_i > T_i$. Then, two rules are formed to connect these states into a graph structure. First, the state $V_i \leq T_i$ will go to both $V_i \leq T_i$ and $V_i > T_i$. Second, the state $V_i > T_i$ will go to both $V_{i+1} \leq T_{i+1}$ and $V_{i+1} > T_{i+1}$.

The above state definition also implies a restriction to the state output. For example, the output for the state $V_i > T_i$ must be greater than $T_i$. Consider the dynamic range of [1,255] for a level in H.264. The output range for $V_i \leq T_i$ is [1, $T_i$], while the output for $V_i > T_i$ will be any integer in [$T_i$+1,255]. For V6, the output range will be the full range of [1,255].

Figure 8:
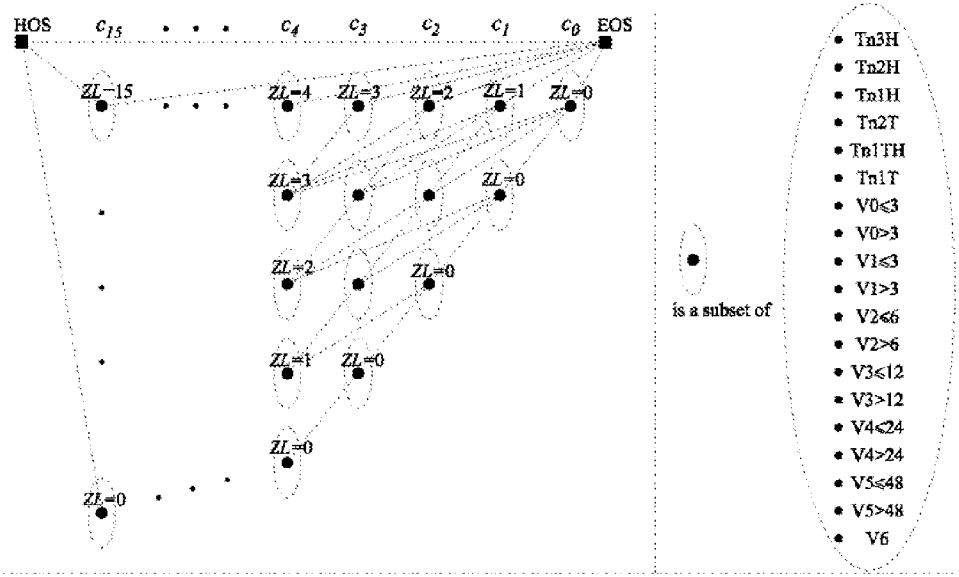
FIG. 8 is a trellis diagram used for deriving a soft decision quantization method.

Now we examine the runs coding process of CAVLC. A runcoding table is selected based on ZerosLeft. Accordingly, we define a state group for each different ZerosLeft. As shown in FIG. 8, a state group is a set of all states defined according to the level coding process and the trailing one rule. For coefficient c(i), there are (i+1) groups, corresponding to ZerosLeft=0, 1, ..., i. It is then straightforward to establish connections among these groups, as shown in the left panel of FIG. 8.

Besides run coding table selection, the formation of state groups according to ZerosLeft provides other two advantages. First, it naturally leads us to know TotalZeros for every path in the graph. Second, it enables us to include the coding rate of CoeffToken in the optimization process by providing the value of TotalCoeffs. For example, TotalCoeffs is equal to i+1-ZerosLeft for a path starting at c(i). In addition, TotalCoeffs is also used to initialize the level coding table.

Based on the state definition for trailing ones and the state group formation, we are able to follow the level coding table initialization rule in the graph design. The rule is based on TotalCoeffs and T1s. As mentioned in the above, T1s is known at the end of trailing ones coding, e.g., T1s=1 for a path containing Tn1H. For a path starting at c(i) with ZerosLeft, we know that TotalCoffs=i+1-ZerosLeft. As a result, the level coding table initialization rule is applied in the graph structure by forming four types of connections. The first is a connection from HOS. Accordingly we have T1s=0. Build connections from HOS to $V_0 \leq 3$ and $V_0 > 3$ in the ZerosLeft group of c(i), when i+1-ZerosLeft≤10; Build connections from HOS to $V_1 \leq 3$ and $V_1 > 3$ in the ZerosLeft group of c(i), when i+1-ZerosLeft>10. The second is a connection from Tn1H. Accordingly we have T1s=1. Build connections from Tn1H to $V_0 \leq 3$ and $V_0 > 3$ in the ZerosLeft group of c(i), when i+1-ZerosLeft 9; Build connections from Tn1H to $V_1 \leq 3$ and $V_1 > 3$ in the ZerosLeft group of c(i), when i+1-ZerosLeft>9. The third is a connection from Tn1TH. Accordingly we have T1s=2. Build connections from Tn1TH to $V_0 \leq 3$ and $V_0 > 3$ in the ZerosLeft group of c(i), when i+1-ZerosLeft≤8; Build connections from Tn1TH to $V_1 \leq 3$ and $V_1 > 3$ in the ZerosLeft group of c(i), when i+1-ZerosLeft>8. The fourth is a connection from Tn1T. Accordingly we have T1s=3. Build connections from Tn1T to $V_0 \leq 3$ and $V_0 > 3$ in the ZerosLeft group of c(i). Eventually, the above connections, together with those connections illustrated in FIG. 7, define all possible connections among states in two groups.

Finally, we can expand the main structure in the left panel of FIG. 8 into a full graph. Specifically, there are 16 columns, each of them corresponding to one coefficient. Each column contains several groups of states. There are (i+1) groups for the column of c(i). The graph structure starts from HOS, with connections going to Tn1H in all groups, to Tn2H in groups with i+1-ZerosLeft>1, to Tn3H in groups with i+1-ZerosLeft>2, to $V_0 \leq 3$ and $V_0 > 3$ in groups with i+1-ZerosLeft 10, and to $V_1 \leq 3$ and $V_1 > 3$ in groups with i+1-ZerosLeft>10. Then, as discussed in the above, connections between state groups are established according to the rules shown in FIG. 7 and the level coding table initialization rule. Eventually, while each group initially contains 19 states as shown in the right panel of FIG. 8, only those states that receive connections from HOS will remain valid. The graph ends at a dummy state EOS. There is also a connection from HOS directly to EOS, corresponding to a case where the whole sequence is quantized to 0.

To show that the rate distortion obtained by using the proposed graph structure to solve the SDQ (23) is optimal, it is sufficient to show that for a given a 4×4 residual block, applying Viterbi algorithm for a search in the proposed graph gives the optimal solution to the soft decision quantization problem of (24). This can be shown by examining a given input sequence $\bar{c}=(c_{15}, \ldots, c_0)$ to determine that any possible sequence of quantization outputs accords to a path in the proposed graph by introducing parallel transitions between two connected states in the graph. Then, we define a metric for each transition in the graph so that for any path the accumulated metric equals to the RD cost of (23). Consequently, Viterbi algorithm can be used to search for a path in the graph to minimize the RD cost, and the obtained path gives the optimal quantization outputs for solving (23).

Parallel transitions between two connected states in the proposed graph can now be defined. As noted above, there are two types of states in the graph, states based on the trailing ones as shown in FIG. 7 and states for the level coding tables as shown in FIG. 7. While a trailing one state will clearly output 1, the output of a state based on a level coding table will be any integer within a given range. Consider a connection from a state $s_1$ at $c_i$ to a state $s_2$ at $c_j$. Denote the output range of $s_2$ as $[u_{low}, u_{high}]$. There will be $(u_{high}-u_{low}+1)$ parallel transitions from $s_1$ to $s_2$, with each according to a unique quantization output within the given range. Clearly, the only difference between those transitions is the quantization output. However, the output is well constrained within a range so that the difference will not affect any other connections. Therefore, they are named parallel transitions. As a result, by restating the fact that for each coding table two complementary states are defined to cover the whole dynamic range of a level (or in case of Vlc(6) the state V6 covers the whole range), it is not hard to see that the proposed graph represents the whole 16-dimensional vector space for the quantization outputs. That is, there is a path according to any quantization output sequence.

To assign a metric to each transition, three types of transitions should be examined, a transition starting from HOS, a transition ending at EOS, and a transition from a state $s_1$ at $c_i$ to a state $s_2$ at $c_j$. Specifically, the RD cost for a transition from HOS to a state $s_1$ at $c_i$ is $$g_{head}(c_i, s_1) = \sum_{k=i+1}^{15} c_k^2 + \qquad (26)$$

$$\lambda \cdot r(ZerosLeft, T1s, TotalCoeffs) + (c_i - u_i \cdot b_i)^2 + \lambda \cdot r_{s_1}(u_i),$$

where the first term is the distortion for quantizing coefficients from $c_{15}$ to $c_{i+1}$ to zero as the encoding starts with $c_i$, the second term gives the rate cost for coding the three parameters, the last two terms accord to the RD cost for quantizing $c_i$ to $u_i$, and $b_i$ is the ith element of $\bar{d}q[p_{rem}] \cdot 2^{p_{quo}}/64 \otimes \bar{B}$.

For a normal transition from state $s_1$ at $c_i$ to state $s_2$ at $c_j$, ($15 \geq i > j \geq 0$), the metric is defined as $$g_n = \sum_{k=j+1}^{i-1} c_k^2 + \lambda \cdot r_{s_1}(i-j-1) + (c_j - u_j \cdot b_j)^2 + \lambda \cdot r_{s_1}(u_j), \quad (27)$$

where the first term computes the distortion for quantizing coefficients in the between to zero, the second term is the rate cost for coding the run with $r_s(i-j-1)$ given by the run coding table at state $s_1$, the last two terms are the RD cost for quantizing c to u with $r_{s_2}(u_j)$ determined by the level coding table at state $s_2$.

Finally, for a transition from a state at the column of c to EOS, the RD cost is $$g_{end}(cj) = \sum_{k=0}^{j-1} c_k^2 \quad (28)$$

which accords to the distortion for quantizing the remaining coefficients from $c_{j-1}$ to $c_0$ to zero.

By examining details of CAVLC, it is can be seen that the accumulated metric along any path leads to the same value as evaluating the RD cost in (23) for the corresponding output sequence. Thus, the Viterbi algorithm is applicable to find the path with the minimal RD cost, and this path gives the quantization output sequence to solve (23).

The complexity of the proposed graph-based soft decision quantization using Viterbi algorithm mainly depends on three factors, the number of columns as 16, the number of states in each column, and the number of parallel transitions. Expansion of FIG. 8 into a full graph reveals that the number of states varies from 17 to 171. With states selectively connected, the major computational cost is to handle the parallel transitions. In practice, however, the number of parallel transitions from a state $s_1$ to a state $s_2$ can be much less than the ($u_{high}-u_{low}+1$) as described in the above because the only difference between them is the quantization output and the distortion is a quadratic function of the quantization output. Simulation results also show that it is sufficient to compute as few as 4 parallel transitions. Thus the complexity is reduced to a fairly low level.

The proposed joint optimization method is implemented based on the H.264 reference software Jm82. For each group of frames, only the first frame is intra coded (I-frame), while all the subsequent frames use temporal prediction (P-frame). The group size is chosen as 21, i.e., one I frame followed by 20 P-frames. The B-frame is not used since we target baseline decoder compatibility. The range for full-pixel motion compensation is ±32. The iteration is stopped when the RD cost decrease is less than 1%. Simulations have been conducted over a range of typical video sequences.

Figure 9A:
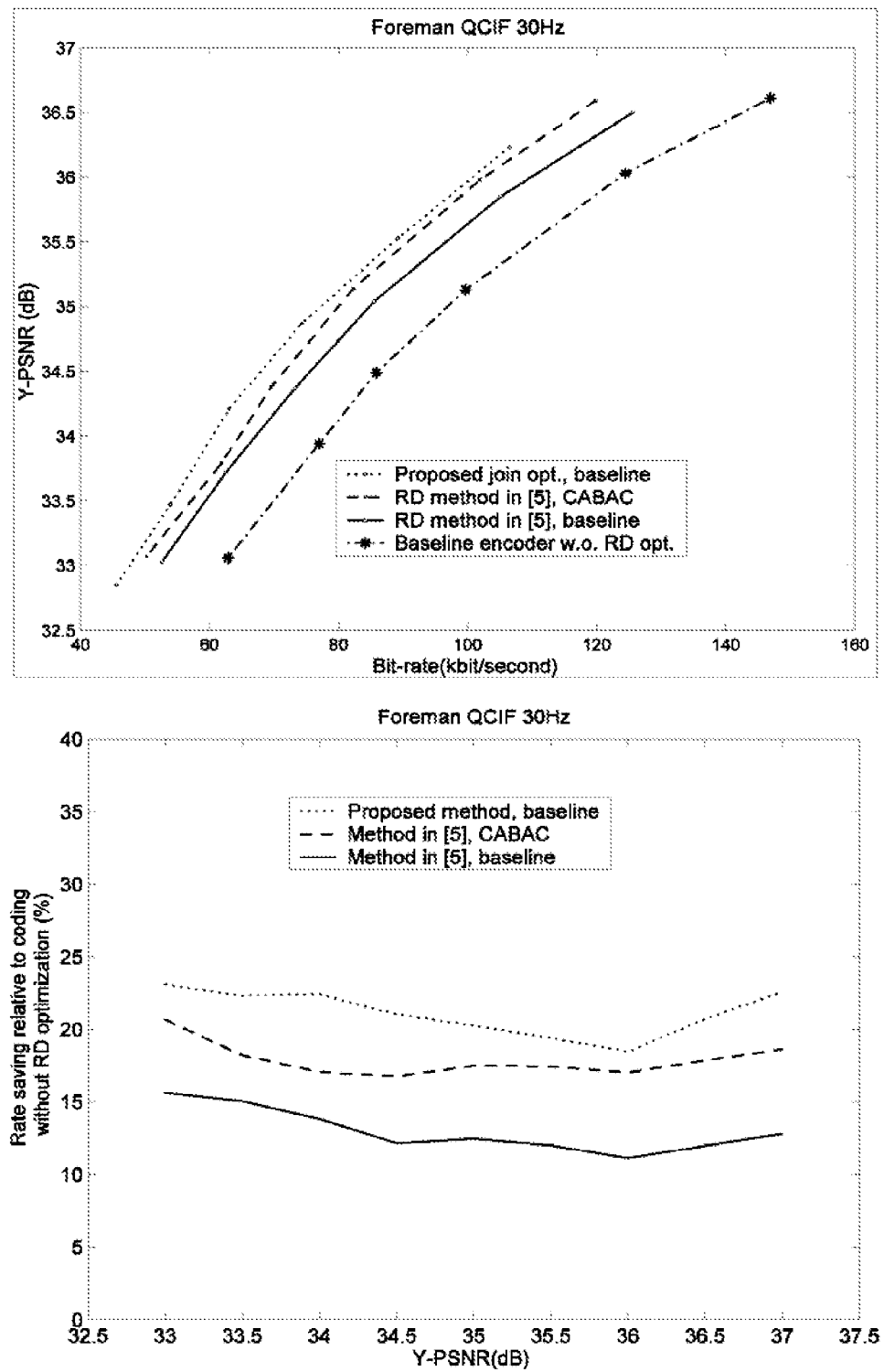
FIGS. 9a, 9b and 9c illustrate encoding performance for standard video sequences.
Figure 9B:
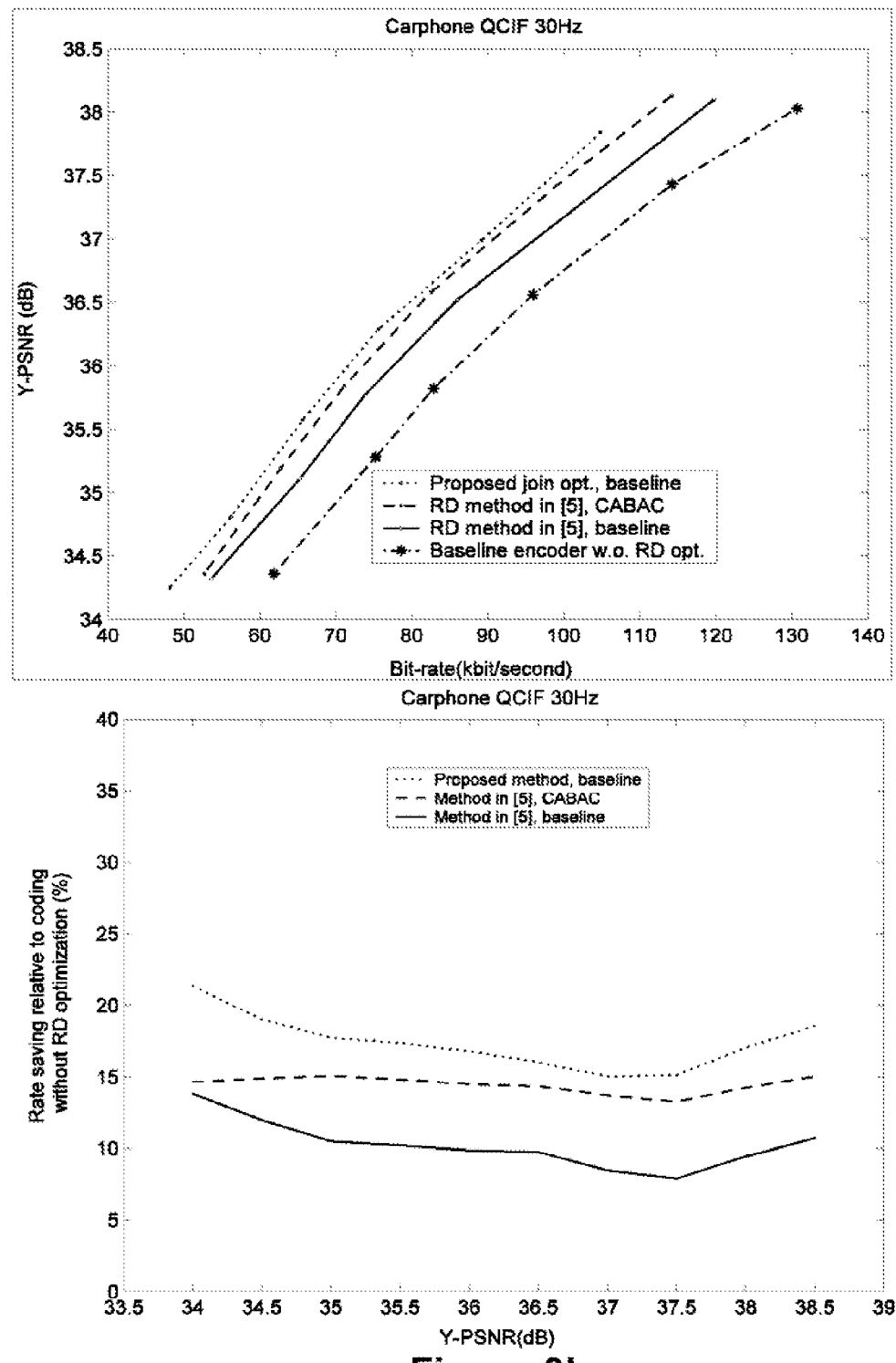
Figure 9C:
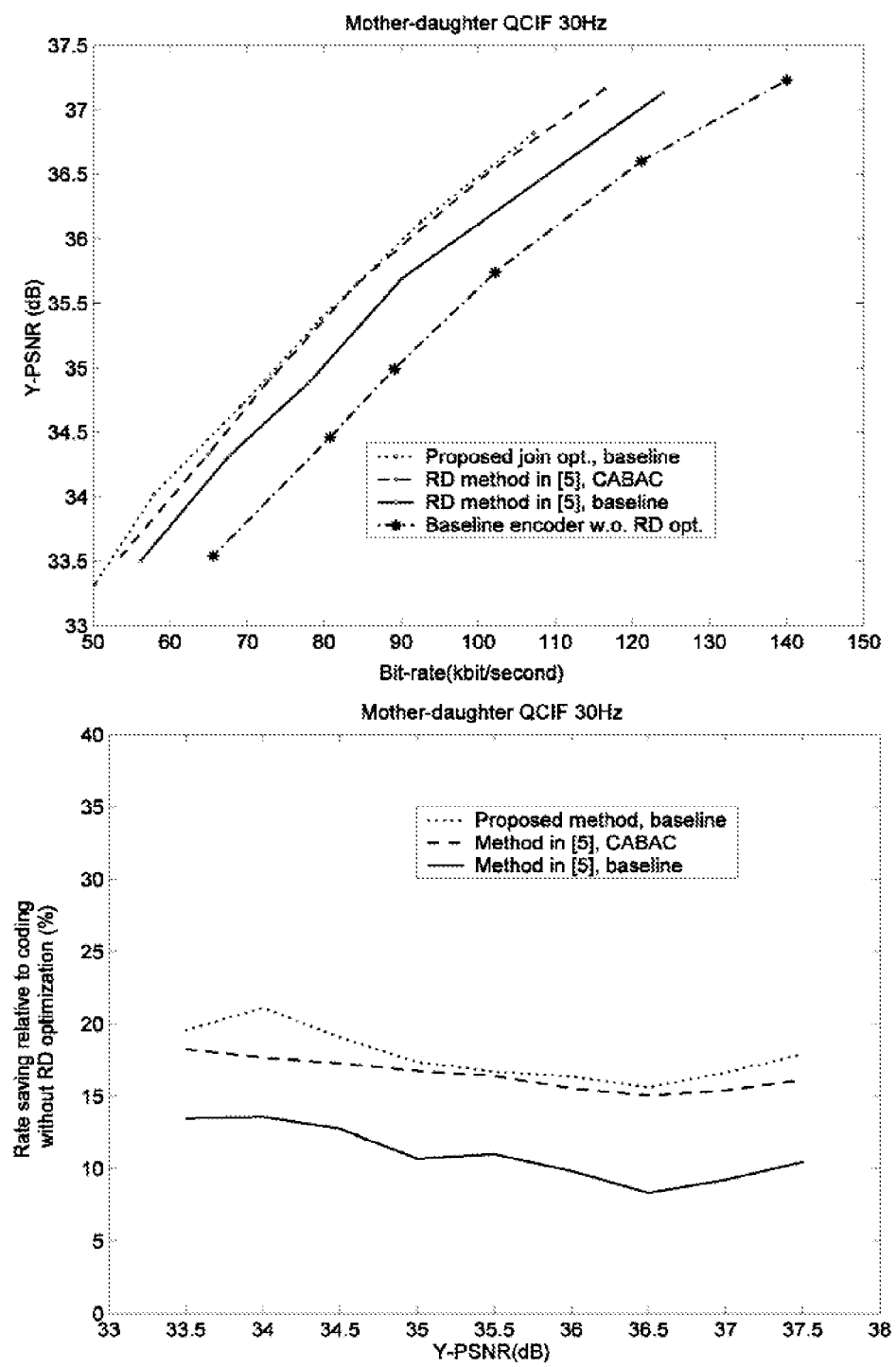
Figure 10A:
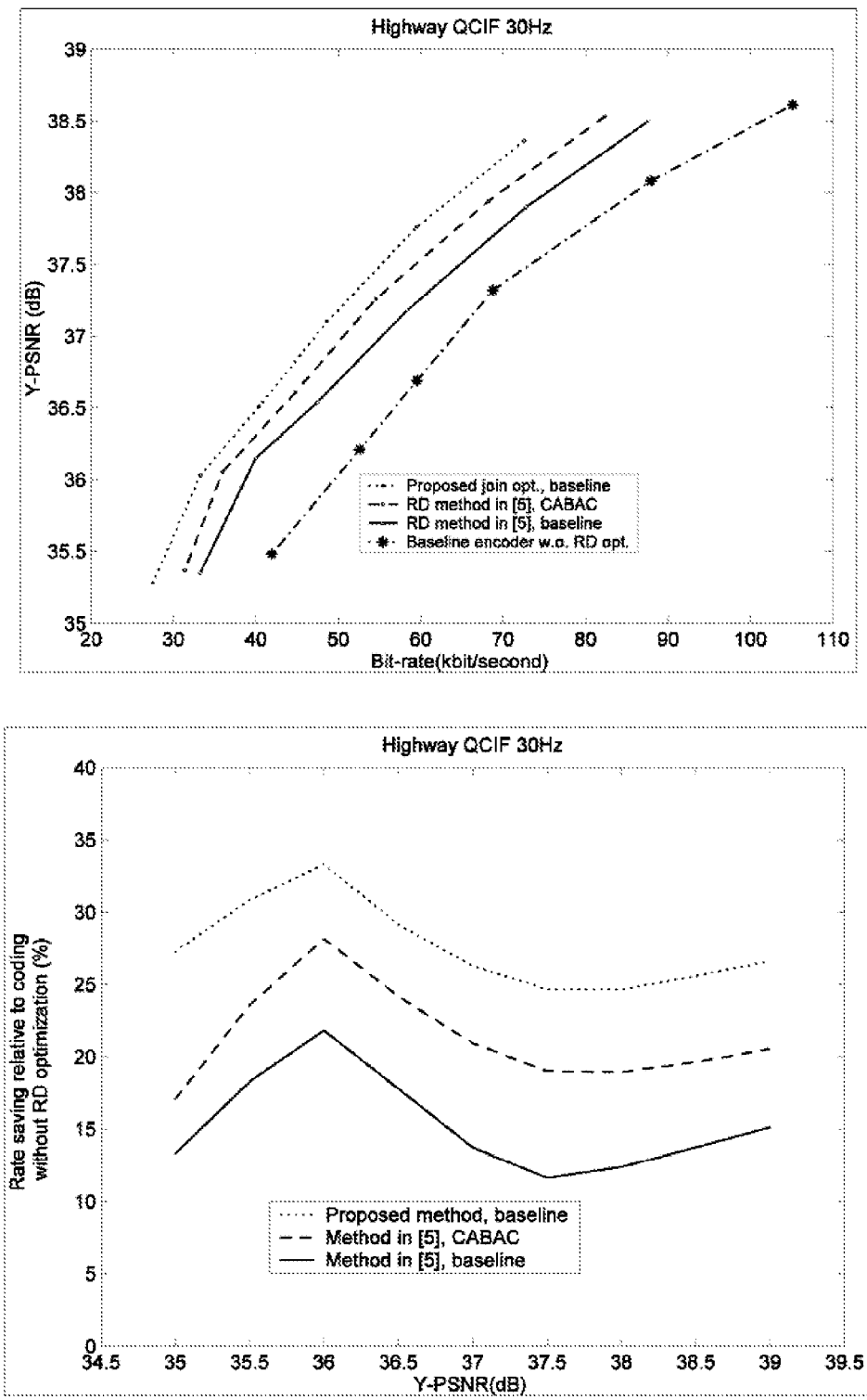
FIGS. 10a and 10b illustrate encoding performance for standard video sequences.
Figure 10B:
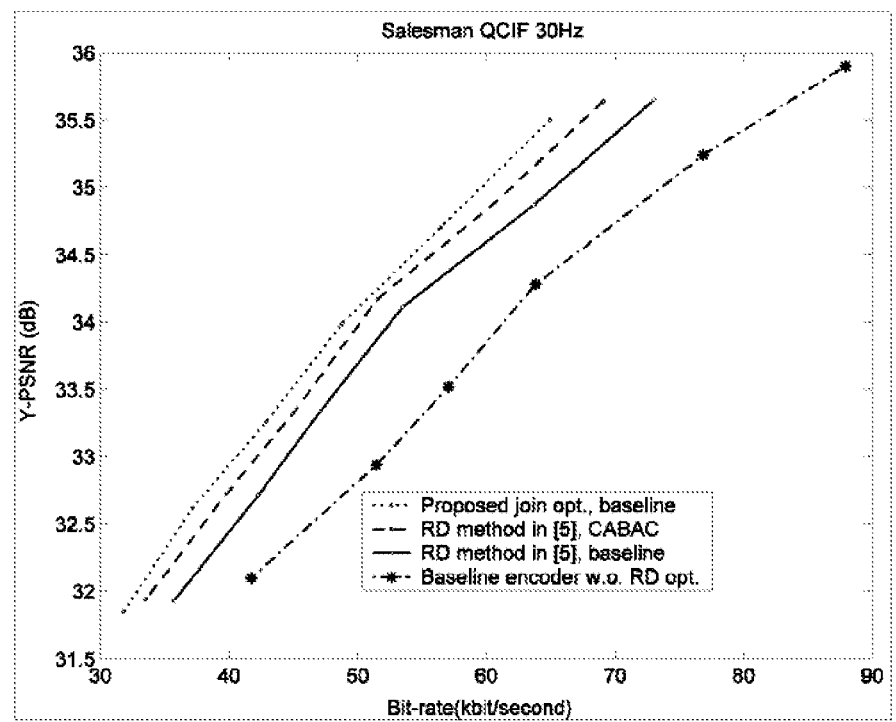
Figure 10B:
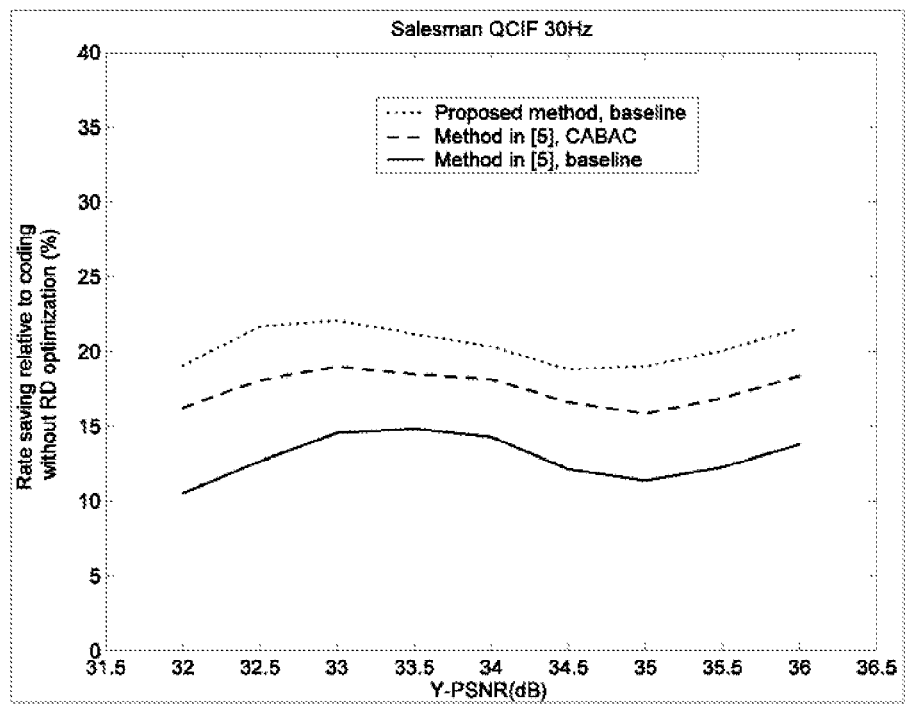

FIGS. 9a, 9b, 9c, 10a and 10b show the RD performance of four methods for coding various video sequences. In FIGS. 9a, 9b and 9c, the RD performance and relative rate savings for coding the standard video sequences "Carphone", "Foreman", and "Mother&Daughter" are shown, respectively. The top panels in each case show the RD curves for four coding methods. In the bottom panels, the relative rate savings over one common method, i.e., the method without RD optimization, are presented for the three RD optimization methods. FIGS. 10a and 10b present similar information for coding video sequences of "Highway" and "Salesman", respectively. The video quality is measured by PSNR, which is defined as $$PSNR = 10\log_{10} \frac{255^2}{MSE}$$

where MSE is the mean square error. The RD curve for the proposed method is obtained by varying the slope $\lambda$ in (5), while RD curves for other methods results from varying the quantization step size. Specifically, the six points on the curve of the proposed methods accord to $\lambda=\{27.2, 34.3, 43.2, 54.4, 68.5, 86.3\}$. In general, a larger $\lambda$ indicates that more distortion should be traded off for a reduced coding rate. For a given $\lambda$, all other parameters, including the quantization step size, are computed in the algorithm to achieve the optimal coding performance. It is shown in the figures that the proposed method achieves the best RD performance while maintaining complete compatibility with the baseline profile of H.264.

It is interesting to see the dashed lines in the top panels of FIGS. 9a, 9b, 9c, 10a and 10b which give the RD performance of the RD optimization method based on the main profile of H.264. The proposed method for the baseline profile outperforms the method for the main profile. The main difference between them is that the baseline profile uses CAVLC while the main profile uses the advanced CABAC. Theoretically, the advantage of CABAC over CAVLC comes from its adaptability to the symbol statistics and its ability to use a noninteger code length. The fundamental 1 bit/symbol limit on the variable length code leads to a poor coding performance for CAVLC when the symbol probability is large, e.g., greater than 0.5. However, it is shown that this fundamental deficit of CAVLC to CABAC has been well compensated when we tune up the whole system with the joint optimization. Furthermore, the baseline CAVLC is much faster than CABAC. Hence, compared to the method in [5] with the main profile CABAC, the proposed method results in a codec that has slightly better coding performance but enjoys a much faster decoding process.

The bottom panels of FIGS. 9a, 9b, 9c, 10a and 10b show the relative rate savings of the three optimization methods over the H.264 codec without any RD optimization. Given two methods A and B the rate saving of B relative to A is defined as, $$S(PSNR) = 100 \cdot \frac{R_A(PSNR) - R_B(PSNR)}{R_A(PSNR)}\%$$

where $R_A(PSNR)$ and $R_B(PSNR)$ are the rate with given PSNR for methods A and B, respectively. The rates of $R_A(PSNR)$ and $R_B(PSNR)$ are calculated by interpolations based on corresponding RD curves. It is shown that with the same coding setting the proposed RD optimization method achieves 20-25% rate gain over the codec without RD optimization, while the baseline-based method in [5] has a gain of 10-15%.

TABLE 1

Average relative bit-rate savings over various video clips with the number of P-frames being 20.

|  | main profile | baseline | No RD optimization, baseline |
|---|---|---|---|
| Proposed method, baseline | 5% | 12% | 23% |

Table 1 provides the average relative rate savings of the proposed method over the other two RD methods and the codec without RD optimization. The results are obtained by averaging over the whole test set of video sequences. The proposed method outperforms the baseline-based method by 12% while they have the same decoding complexity. On the other side, the relative gain over the main profile method is marginal, but the proposed method enjoys a faster decoding process as discussed in the above.

Hybrid video compression generally implies high correlation among frames due to the application of inter-frame prediction. Ideally, an optimization method for hybrid video compression should consider at least a group of frames if not the whole video sequence. However, this is not practical because by far there is no effective way to characterize the inter-frame correlation mathematically. The method proposed in this paper optimizes the coding performance for each individual frame. Specifically, the reference frames are assumed to be fixed when we optimize the coding procedure for a given frame. From the RD theoretical point of view, it is unclear what the effect on the RD performance for coding the whole sequence is. Clearly, the relative rate savings decreases as N increases due to the error accumulation, as indicated in the performance charts. However, in comparison to other methods, the present invention provides a constant gain indicating a positive effect of the proposed optimization method on the RD performance for coding the whole sequence.

Figure 11:
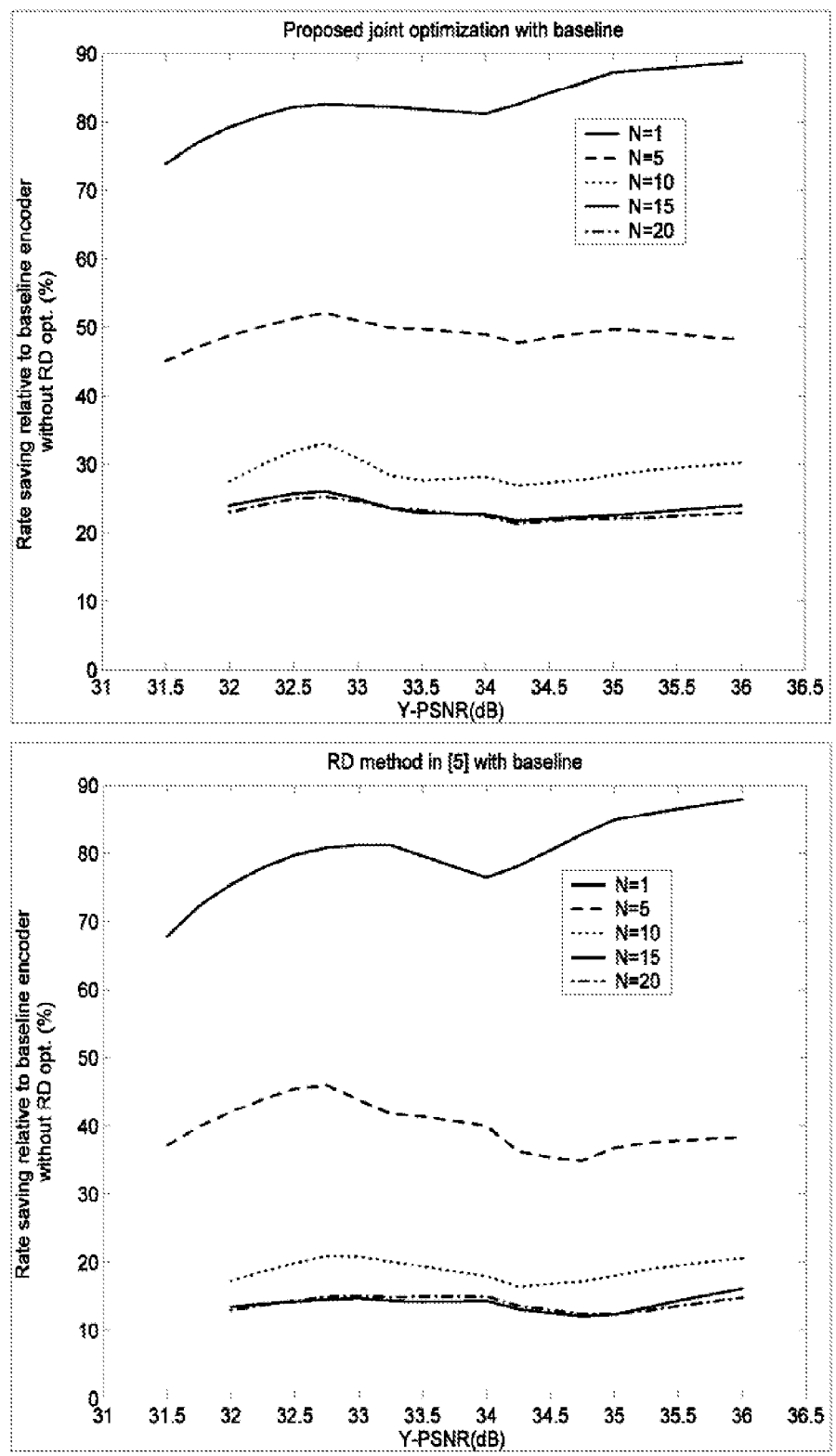
FIG. 11 illustrates error accumulation during the encoding of a standard video sequence.
Figure 12:
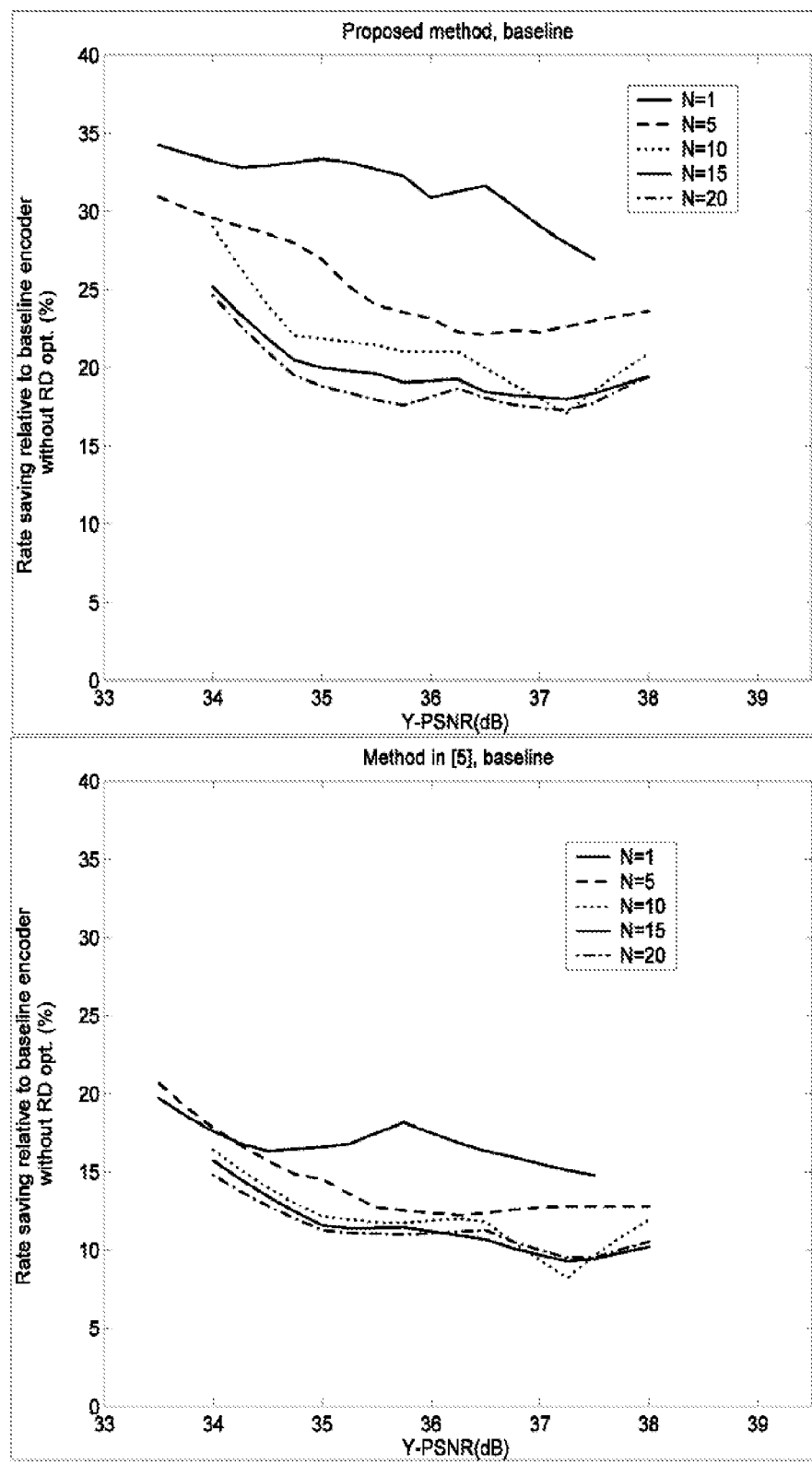
FIG. 12 illustrates error accumulation during the encoding of a standard video sequence.

FIG. 11 illustrates the error accumulation problem, by the relative rate savings averaged over various numbers of frames for coding the sequence of "Foreman". N is the number of frames. N=10 accords to an averaging result over 10 frames. FIG. 12 illustrates the error accumulation problem, by the relative rate savings averaged over various numbers of frames for coding the sequence of "Salesman".

The proposed framework explored the best RD performance that a codec can achieve while preserving the compatibility with the baseline profile of H.264, targeting applications with off-line encoding. The disclosed method achieves a significant compression gain, as up to 20~25% rate reduction at the same PSNR when compared to the reference codec. Clearly, the coding gain is offset by increasing the encoding complexity. However, for applications such as video delivery, encoding is conducted off-line and normally only once.

Rate distortion optimization and rate control are closely related to each other in real world applications of video compression. It is of some interest to compare the proposed method with generic rate control algorithms. Most rate control methods use the quantization step size as the control parameter. In general, rate distortion optimization is considered as complementary to rate control, i.e., rate distortion optimization is conducted based on a given quantization step size determined by the rate control algorithm. The proposed method, however, considers quantization step sizes as an optimization variable. Therefore, the proposed rate distortion method cannot be used together with a generic rate control method. However, there is a new control parameter, the $\lambda$. From the codec control point of view, $\lambda$ defines the relative significance of the rate and the quality. In general, a greater $\lambda$ means that more distortion is allowed to achieve a less rate. For applications such as video delivery, neither the absolute amount of distortion nor the absolute amount of rate plays a dominant role. It is convenient to watch out the relative cost of the rate and the distortion by monitoring the $\lambda$.

In general, the SDQ-based joint optimization framework is applicable to any coding method with a hybrid structure. Although the above disclosure has been largely directed to application to H.264, one skilled in the art will appreciate that these advances can be applied to other hybrid coding standards by developing algorithms, particularly the SDQ algorithm, accordingly. The embodiment of SDQ proposed in this paper is based on the baseline method CAVLC in H.264. To improve the coding performance of the main profile encoder for H.264, soft decision quantization algorithm can be designed based on the CABAC method and be embedded into the joint optimization framework.

One skilled in the art will appreciate that the methods outlined above can be implemented on numerous platforms including standard computing platforms, and dedicated hardware platforms. The cross optimization of elements can be implemented using the standard hardware designs known to those skilled in the art, but making use of a control channel between elements, or a logic processor in the quantizer and motion compensator to evaluate at the end of each iterative cycle whether or not the reduction in the rate distortion has been sufficient. Such as system can be implemented using standard hardware and software combinations.

In the above description, for purposes of explanation, numerous details have been set forth in order to provide a thorough understanding of the present invention. However, it will be apparent to one skilled in the art that these specific details are not necessarily required in order to practice the present invention. In other instances, well-known electrical structures and circuits are shown in block diagram form in order not to obscure the present invention. For example, specific details are not provided as to whether the embodiments of the invention described herein are implemented as a software routine, hardware circuit, firmware, or a combination thereof.

Embodiments of the invention may be represented as a software product stored on a machine-readable medium (also referred to as a computer-readable medium, a processor-readable medium, or a computer usable medium having a computer readable program code embodied therein). the machine-readable medium may be any type of magnetic, optical, or electrical storage medium including a diskette, compact disk read only memory (CD-ROM), memory device (volatile or non-volatile), or similar storage mechanism. The machine-readable medium may contain various sets of instructions, code sequences, configuration information, or other data. Those of ordinary skill in the art will appreciate that other instructions and operations necessary to implement the described invention may also be stored on the machine-readable medium. Software running from the machine readable medium may interface with circuitry to perform the described tasks.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A method for obtaining an optimal sequence of quantized coefficients for a block of transform residuals from a video, for encoding the video in a video encoder, the method comprising:
    obtaining a sequence of quantized coefficients for the block of transform residuals;
    calculating for the obtained sequence a rate-distortion cost based on a distortion cost and on a rate cost based on a context-adaptive entropy encoder, wherein the context-adaptive entropy encoder encodes each quantized coefficient by selecting at least one context from a plurality of contexts by determining an index for a set of contexts based, at least in part, on a previous quantized coefficient in the sequence of quantized coefficients; and
    changing a value of one of said quantized coefficients of the obtained sequence to produce a new sequence of quantized coefficients, so that a resulting rate-distortion cost for the new sequence of quantized coefficients is smaller than a rate-distortion cost for the obtained sequence.

2. The method of claim 1, wherein changing a value comprises evaluating a plurality of candidate levels for said one of said quantized coefficients by determining a new rate cost and a new distortion cost resulting from each candidate level and selecting the candidate level that results in the minimum rate-distortion cost for the new sequence.

3. The method of claim 2, wherein one of the candidate levels comprises the magnitude of said one of the quantized coefficients increased by 1 and another of the candidate levels comprises the magnitude of said one of the quantized coefficients decreased by 1.

4. The method of claim 2, wherein said one the said quantized coefficients equals zero, and wherein one of the candidate levels comprises a non-zero value.

5. The method of claim 2, wherein evaluating a plurality of candidate levels for said one of said quantized coefficients includes identifying possible candidate levels for said one of said quantized coefficients and determining possible contexts associated with each possible candidate level.

6. The method of claim 5, wherein determining the new rate cost comprises determining the new rate cost for each combination of possible candidate level and possible contexts associated with that candidate level.

7. The method of claim 6, wherein the context component of one of the combinations comprises a coding table having a rate function, and wherein determining the new rate cost for said one of the combinations includes applying the rate function.

8. The method of claim 5, wherein determining the new rate cost for each combination of possible candidate level and possible context associated with that candidate level comprises adaptively selecting a coding table for each combination.

9. The method of claim 2, wherein determining the new rate cost resulting from each candidate level comprises:
    determining possible contexts associated with that candidate level; and
    calculating a rate cost associated with that candidate level for each of the possible contexts.

10. A video encoder for encoding a video by obtaining an optimal sequence of quantized coefficients for a block of transform residuals from the video, the video encoder comprising:
    a processor;
    memory;
    a video encoding application executable by the processor and which, when executed, configures the processor to:
        obtain a sequence of quantized coefficients for the block of transform residuals;
        calculate, for the obtained sequence, a rate-distortion cost based on a distortion cost and on a rate cost based on a context-adaptive entropy encoder, wherein the context-adaptive entropy encoder encodes each quantized coefficient by selecting at least one context from a plurality of contexts by determining an index for a set of contexts based, at least in part, on a previous quantized coefficient in the sequence of quantized coefficients; and
        change a value of one of said quantized coefficients of the obtained sequence to produce a new sequence of quantized coefficients, so that a resulting rate-distortion cost for the new sequence of quantized coefficients is smaller than a rate-distortion cost for the obtained sequence.

11. The video encoder of claim 10, wherein the processor is configured to change a value by evaluating a plurality of candidate levels for said one of said quantized coefficients by determining a new rate cost and a new distortion cost resulting from each candidate level and selecting the candidate level that results in the minimum rate-distortion cost for the new sequence.

12. The video encoder of claim 11, wherein one of the candidate levels comprises the magnitude of said one of the quantized coefficients increased by 1 and another of the candidate levels comprises the magnitude of said one of the quantized coefficients decreased by 1.

13. The video encoder of claim 11, wherein said one the said quantized coefficients equals zero, and wherein one of the candidate levels comprises a non-zero value.

14. The video encoder of claim 11, wherein the processor is configured to evaluate a plurality of candidate levels for said one of said quantized coefficients by identifying possible candidate levels for said one of said quantized coefficients and determining possible contexts associated with each possible candidate level.

15. The video encoder of claim 14, wherein the processor is configured to determine the new rate cost by determining the new rate cost for each combination of possible candidate level and possible context associated with that candidate level.

16. The video encoder of claim 15, wherein the context component of one of the combinations comprises a coding table having a rate function, and wherein the processor is configured to determine the new rate cost for said one of the combinations by applying the rate function.

17. The video encoder of claim 14, wherein the processor is configured to determine the new rate cost for each combination of possible candidate level and possible context associated with that candidate level by adaptively selecting a coding table for each combination.

18. The video encoder of claim 11, wherein the processor is configured to determine the new rate cost resulting from each candidate level by:
    determining possible contexts associated with that candidate level; and
    calculating a rate cost associated with that candidate level for each of the possible contexts.

19. A non-transitory computer-readable medium storing processor-executable instructions, for obtaining an optimal sequence of quantized coefficients for a block of transform residuals from a video, wherein the instructions, when executed, configure one or more processors to:
    obtain a sequence of quantized coefficients for the block of transform residuals;

calculate for the obtained sequence a rate-distortion cost based on a distortion cost and on a rate cost based on a context-adaptive entropy encoder, wherein the context-adaptive entropy encoder encodes each quantized coefficient by selecting at least one context from a plurality of contexts by determining an index for a set of contexts based, at least in part, on a previous quantized coefficient in the sequence of quantized coefficients; and change a value of one of said quantized coefficients of the obtained sequence to produce a new sequence of quantized coefficients, so that a resulting rate-distortion cost for the new sequence of quantized coefficients is smaller than a rate-distortion cost for the obtained sequence.

* * * * *